United States Patent
Leung et al.

(10) Patent No.: US 11,468,524 B2
(45) Date of Patent: Oct. 11, 2022

(54) REDUCING THE COST OF ELECTRICAL ENERGY IN A MANUFACTURING PLANT

(71) Applicant: Noodle Analytics, Inc., San Francisco, CA (US)

(72) Inventors: Ying Tat Leung, Saratoga, CA (US); Nayan Ketak Dharamshi, Bangalore (IN); Rohan Jha, Oakland, CA (US); Harshini Mogili, Andhra Pradesh (IN); Matthew Denesuk, Palo Alto, CA (US)

(73) Assignee: Noodle Analytics, Inc., San Francisco, CA (US)

( * ) Notice: Subject to any disclaimer, the term of this patent is extended or adjusted under 35 U.S.C. 154(b) by 643 days.

(21) Appl. No.: 16/382,544

(22) Filed: Apr. 12, 2019

(65) Prior Publication Data

US 2020/0327626 A1 Oct. 15, 2020

(51) Int. Cl.
*G06Q 50/06* (2012.01)
*G06N 20/00* (2019.01)

(52) U.S. Cl.
CPC .............. *G06Q 50/06* (2013.01); *G06N 20/00* (2019.01)

(58) Field of Classification Search
USPC .................................................. 705/14.1, 412
See application file for complete search history.

(56) References Cited

U.S. PATENT DOCUMENTS

| | | |
|---|---|---|
| 5,768,505 A | 6/1998 | Gilchrist et al. |
| 6,018,742 A | 1/2000 | Herbert, III |
| 6,429,860 B1 | 8/2002 | Hughes |
| 6,523,037 B1 | 2/2003 | Monahan et al. |
| 6,993,137 B2 | 1/2006 | Fransdonk |
| 7,440,901 B1 | 10/2008 | Dlott et al. |
| 8,024,374 B2 | 9/2011 | Yorke |

(Continued)

FOREIGN PATENT DOCUMENTS

| | | |
|---|---|---|
| EP | 0747811 A2 | 12/1996 |
| EP | 1677209 B1 | 11/2008 |
| EP | 2579150 A1 | 4/2013 |

OTHER PUBLICATIONS

Design_Analysis_and_Operation_of_the_Electrical_Distribution_System_for_a_Modern_Electric_Arc_Furnace_and_Ladle_Melt_Furnace (Year: 2010).*

(Continued)

*Primary Examiner* — Gautam Ubale
(74) *Attorney, Agent, or Firm* — Schwegman Lundberg & Woessner, P.A.

(57) ABSTRACT

A system is presented for predicting the amount of energy required by a manufacturing plant over a period of time, and then providing a recommendation on the best amount of energy to sell at each period, taking into consideration the energy requirements based on the production schedule, the price of energy, possible penalties for over selling energy, and other factors. A user interface is provided to present relevant information to a user, allow the user to plan the use of energy, and determine the energy offering for sale in each period. Based on a known future production schedule of a steel mill, implementations provide a forecast of electrical energy usage per hour over the same time horizon as the production schedule. Based on the forecast and electricity selling and billing rules, a recommended amount of energy to be sold to the market by the hour is presented with the corresponding offer price.

20 Claims, 14 Drawing Sheets

(56) References Cited

U.S. PATENT DOCUMENTS

| | | | |
|---|---|---|---|
| 2011/0088011 A1 | 4/2011 | Ouali | |
| 2013/0091431 A1 | 4/2013 | Master et al. | |
| 2013/0268553 A1 | 10/2013 | Surry et al. | |
| 2014/0316973 A1* | 10/2014 | Steven | G05B 13/026 705/37 |
| 2019/0086882 A1* | 3/2019 | Okita | G05B 15/02 |
| 2019/0372345 A1* | 12/2019 | Bain | H02J 3/381 |
| 2020/0327626 A1* | 10/2020 | Leung | G06N 20/00 |

OTHER PUBLICATIONS

A_research_based_on_the_energy_consumption_of_a_balanced_cold_rolling_mill_production_scheduling_optimization (Year: 2014).*

Autonomous_Appliance_Scheduling_for_Household_Energy_Management (Year: 2014).*

Intelligence_Improvement_of_a_Prosumer_Node_through_the_Predictive_Concept (Year: 2012).*

Collaborative_Energy_Management_in_Micro-Grid_environments_through_multi-objective_optimization (Year: 2017).*

Real_time_market_models_and_prosumer_profiling (Year: 2013).*

"Figure", [online], [archived on Dec. 5, 2014]. Retrieved from the Internet: <URL: https://web.archive.org/web/20141205135335/http://www.appledailyreport.com/wp-content/uploads/2014/07/Apple-Maps-Integration-Patent.jpg>, (2014), 1 pg.

Aman, Syazwani, et al., "Modelling and forecasting electricity consumption of Malysian large steel mills", Scientific Research and Essays, 6(8), (2011), 1817-1830.

Chen, Chong, et al., "Energy Consumption Modelling Using Deep Learning Technique—A Case Study of EAF", Procedia CIRP, 72, (2018), 1063-1068.

Lu, Biao, et al., "Statistical Analysis between Output and Energy Consumption of Production Process in Iron and Steel Industry", 2016 International Conference on Manufacturing Construction and Energy Engineering (MCEE), (2016), 269-273.

Orcajo, G. Alonso, et al., "Dynamic Estimation of Electrical Demand in Hot Rolling Mills", IEEE Transactions on Industry Applications, 52(3), (2016), 1-10.

Zhang, Yanyan, et al., "Energy Consumption Prediction in Ironmaking Process Using Hybrid Algorithm o SVM and PSO", In: ISNN 2012, Part II, LNCS 7368, (2012), 594-600.

* cited by examiner

REDUCING THE COST OF ELECTRICAL ENERGY IN A MANUFACTURING PLANT

TECHNICAL FIELD

The subject matter disclosed herein generally relates to methods, systems, and machine-readable storage media for managing energy resources.

BACKGROUND

Steel making is an energy-intensive business with furnaces and equipment that consume large amounts of energy to melt scrap into molten metal and roll the molten metal into steel coils. Often, steel mills enter into contractual agreements with an energy provider so that the energy provider can provide adequate electrical energy.

Electrical energy usage in the mill is not constant over time but depends on the kind of product being produced. Sometimes, the energy use is high and other times the use is low, maybe as low as virtually zero when the plant is shut down due to maintenance or for some other reason. When the steel mill is not consuming high energy, the steel mill can sell energy back to the electricity grid (e.g., via their own energy provider) through an energy marketplace to reduce the electricity bill.

However, the steel mill must be sure that the energy is available for resale because if the energy mill uses more energy than expected, selling energy to the marketplace may result in costly penalties, which will increase the electricity bill instead of decreasing it. Thus, predicting accurately energy consumption may allow the steel mill to optimize the buying and selling of energy to reduce costs.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
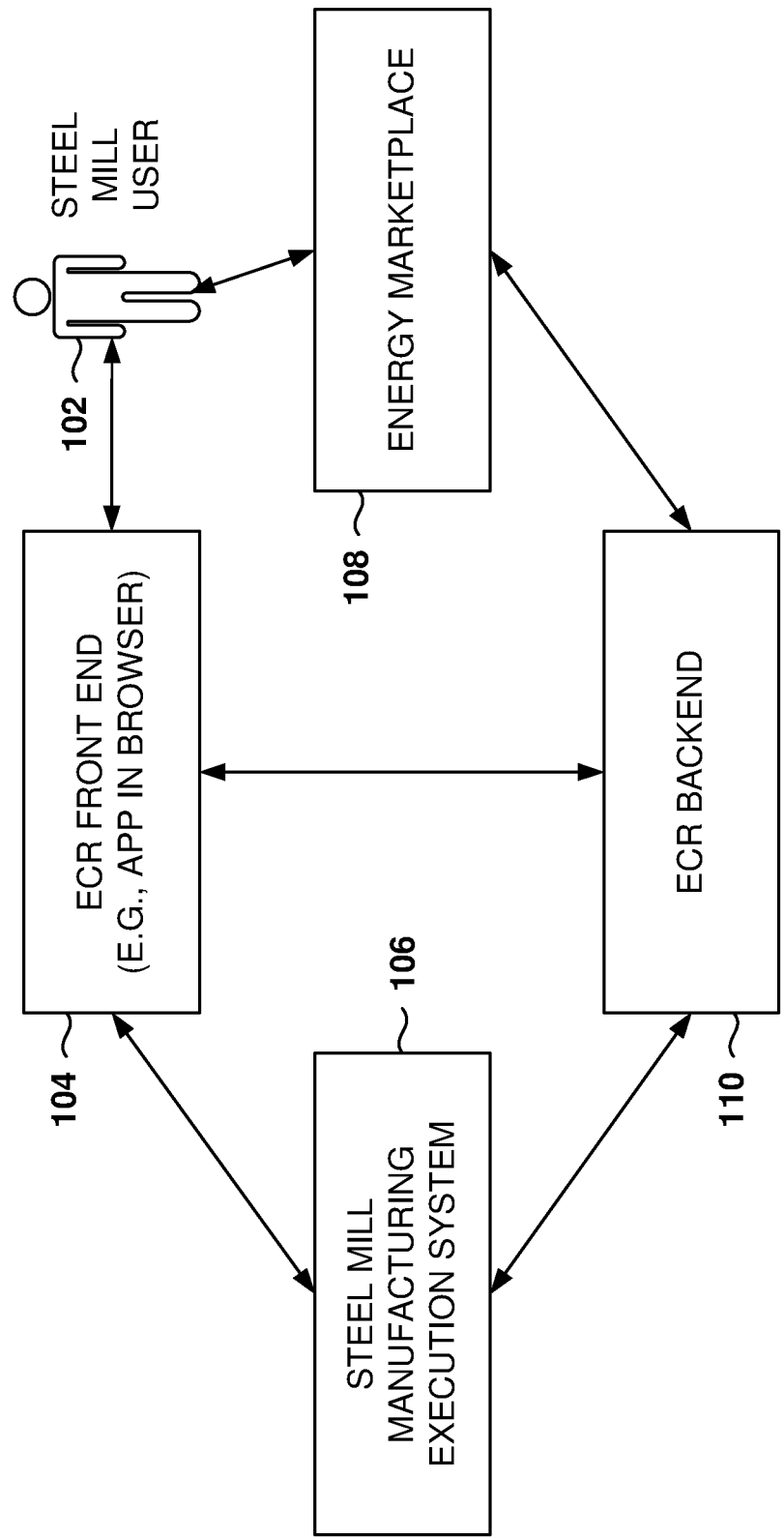
FIG. 1 is a high-level architecture for an energy cost-reduction (ECR) system, according to some example embodiments.

Example methods, systems, and computer programs are directed to managing energy usage based on predicted energy consumption. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Electricity cost is typically the second highest cost in a steel mill, after raw material cost. For example, a steel mill with a single electric arc furnace and a single ladle metallurgy furnace feeding a single continuous caster uses in the order of 150 MWh of electricity per hour, with a monthly electricity cost of several million dollars.

A steel mill may sell electricity on an energy market but selling is typically limited to hours when all or a great part of the steel mill is planned to be taken down for routine maintenance or some other known causes. However, there is an opportunity to sell some energy throughout the day if the steel mill is not operating at full capacity using all the energy contracted with a supplier.

In some cases, the energy contract with an energy provider provides for billing for both peak demand and energy used. This type of contract presents a couple of potential opportunities for optimizing the electricity cost. The first opportunity is to optimize peak electricity usage so the peak demand for a given month does not go over the contractual amount. The second opportunity is to identify periods times when the steel mill is not consuming high energy, so the steel mill can sell energy back to the grid and recover some of the electricity expenses.

In one aspect, a system is presented for predicting the amount of energy required by the steel mill over a period of time, and then providing a recommendation on the best amount of energy to sell in each period, taking into consideration the energy requirements based on the production schedule, the price of energy, possible penalties for over selling energy, and other factors. A user interface is provided to present relevant information to a user, allow the user to plan the use of energy, and determine the energy offering for sale in each period.

Based on a known future production schedule of a steel mill, embodiments provide a forecast of electrical energy usage per hour over the same time horizon as the production schedule. Based on the forecast and electricity buying and selling rules, a recommended amount of energy to be sold to the market by the hour is presented with the corresponding offer price.

Further, the system allows a steel mill to sell electrical energy whenever the predicted energy usage is low, even when the mill or production lines are not down. The ECR system enables the optimization of energy consumption at a steel mill, which adds both financial and environmental value.

Embodiments presented herein are described with reference to a steel mill and electricity consumption, but the same principles may be applied to other businesses and other types of resources. For example, the same principles may be applied to other businesses that utilize large amount of electricity (e.g., other types of manufacturing), businesses that generate solar energy and may resell the solar energy, etc. Further, other type of resources may be managed, such as natural gas, network bandwidth, computing resources, cash, etc.

One general aspect includes a method that includes operations for accessing a production schedule or plan of an energy consumer, and for predicting energy consumption by the scheduled production processes energy consumer based on the production schedule or plan for a predetermined time period. The energy consumer has a baseline for hourly consumption during the predetermined time period. Further, predicting the energy consumption includes utilizing a machine-learning model to identify duration of the energy-consuming production processes during the predetermined time period. The method further includes causing presentation of a user interface to present the production schedule or plan and the predicted energy consumption for the production schedule or plan. Input is received, via the user interface, to establish the production schedule, and, based on the established production schedule, calculating recommendations for selling energy in each hour within the predetermined time period are calculated. The calculation is based on the predicted energy consumption and a probability of a penalty when energy consumption exceeds the baseline within each hour. Further, the method includes operations for receiving, via the user interface, an energy offer for sale for one or more hours, and for interfacing with an energy provider to offer the energy offer for sale for the one or more hours.

FIG. 1 is a high-level architecture for an energy cost-reduction (ECR) system, according to some example embodiments. A steel mill manufacturing execution system 106 controls the production processes that produce steel and consume large amounts of electricity.

In general, the steel plant includes a hot area and a cold area. The hot area includes, among other components, an Electric Arc Furnace (EAF), a Ladle Metallurgical Furnace (LMF), a Continuous Caster (CCS), and a Hot Strip Mill (HSM). The cold area includes a Pickling Line (PL), a Tandem Cold Mill (TCM), a Galvanized Line (GL), a Batch Annealing Furnace (BAF), and a Skin Pass Mill (SPM).

The EAF and LMF together typically account for about 65-70% of the total energy consumption in the steel mill. The rest of the production equipment, along with auxiliary and administrative requirements, account for 30-35% of the energy consumption. Some embodiments are described with reference to EAF and LMF, but other embodiments may include other systems for energy prediction and for scheduling the execution of the different processes.

The ECR backend 110 makes energy-usage predictions (energy consumption ($E_F$) for scheduled future production) and offers recommendations on the best energy selling policy based on a plurality of parameters.

The ECR backend communicates with the ECR front end 104 to relay the necessary information so the ECR front end 104 provides a graphical user interface (e.g., an application executing on a web browser or a custom application executing on a computing device) to the user for presentation of relevant information and enabling the user to make decisions on the energy offered for sale to the energy marketplace 108.

The energy marketplace 108 is the place where energy (e.g., electricity) is bought and sold. Typically, the steel mill has an agreement with the electricity provider for a certain amount of electricity to be consumed. The agreement may also allow the steel mill to resell the electricity that the steel mill does not consume under the agreement. Sometimes, a baseline is calculated that determines the amount of electricity the steel mill typically consumes, and the electricity not used below the baseline may be resold through the electricity marketplace.

In some cases, the baseline is the amount of hourly energy contracted with the energy provider. In other cases, the baseline is based on a historical average of energy consumption. For example, if the steel mill uses 50 MW on average for the last 90 days, the baseline is set at 50 MW, even if the contracted amount is higher than 50 MW. Typically, the baseline will be close to the contracted amount to avoid waste and overpayment.

In some cases, there are two types of markets. The first market is the day-ahead market, where an offer to sell energy is placed before midnight for the following day. The second market is, a real-time market where energy is sold in real-time trading before the beginning of each hour (e.g., 30 minutes before the beginning of the hour). Embodiments presented herein are described with reference to the real-time market, but the principles presented may be utilized in other types of markets.

The ECR backend 110 is in communication with the energy marketplace 108 to obtain information on the current state of the marketplace (e.g., electricity bid and ask prices), get historical price data, and to send sell offers to the energy marketplace 108.

Figure 2:
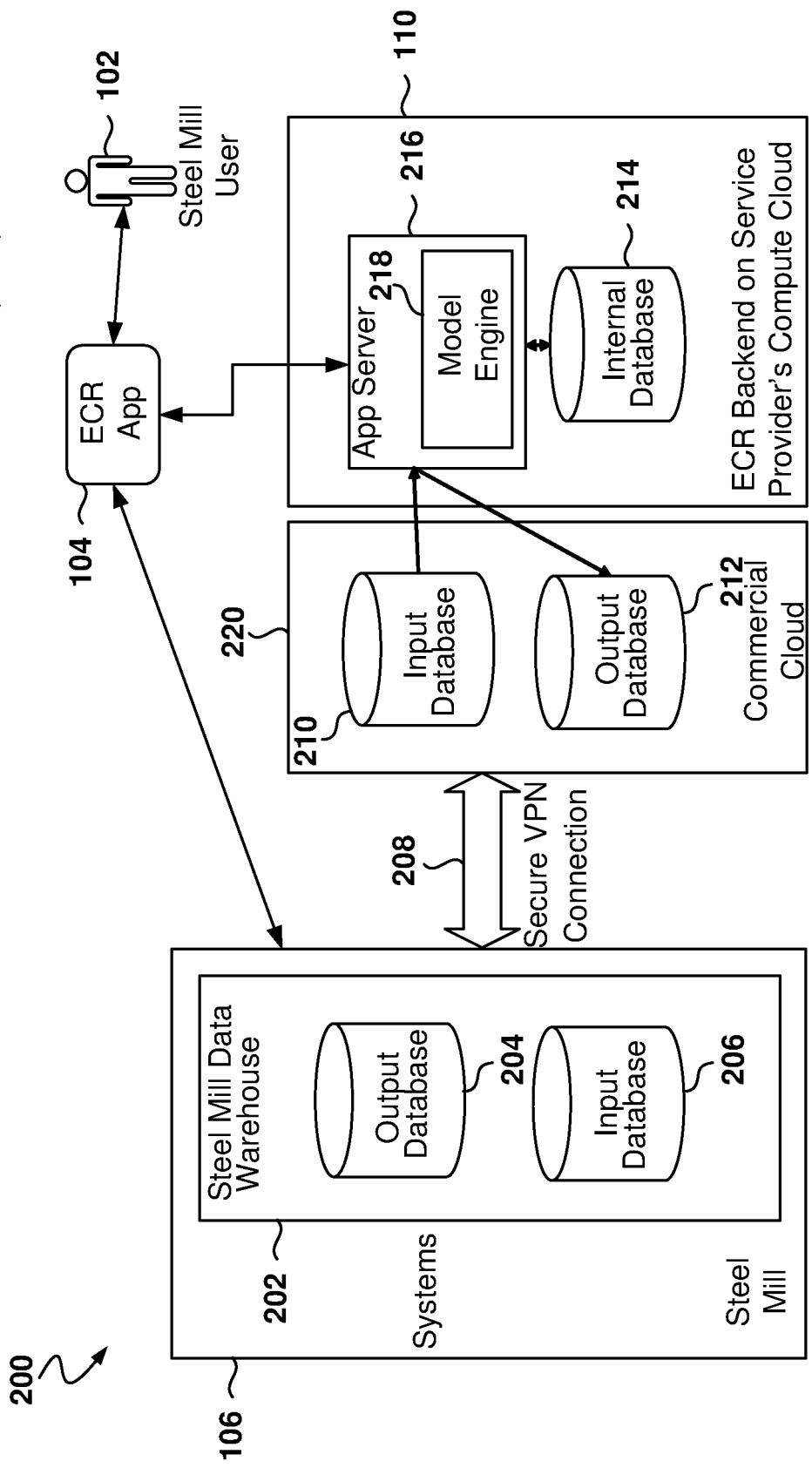
FIG. 2 is a system architecture for the ECR system, according to some example embodiments.

FIG. 2 is an exemplary system architecture 200 for the ECR system, according to some example embodiments. The steel mill 106 includes a plurality of systems 202 for executing processes at the steel mill, such as managing inventory, production scheduling, inventory management, etc. The steel mill systems 202 include an input database 206 and an output database 204 configured to exchange information with the ECR backend 110.

In some example embodiments, the ECR backend 110 includes an internal database 214 and may also use third-party commercial cloud 220 for storing data (e.g., input database 210 and output database 212). The steel mill systems 202 stores and retrieves data in the commercial cloud 220 and this data in the commercial cloud 220 is also accessible to the ECR backend 110. In other example embodiments, the steel mill systems 202 may communicate directly with the ECR backend 110, without the use of the commercial cloud 220.

In some example embodiments, a secure virtual private network (VPN) connection 208 is used to communicate between the steel mill systems 202 and the commercial cloud 220 or the ECR backend 110.

The ECR backend 110 includes an application server 216 that communicates with the steel mill systems 202 and the ECR application 104 used by the user 102. The application server 216 includes a model engine 218 for performing ECR operations, as described in more detail below.

Several data sets are used for storage in the different databases. The data sets include energy consumption (E), scheduling (P), input materials (M), target slab/coil specifications (C), and operator and shift details (O).

The E dataset includes the energy consumed by the steel mill. In some example embodiments, the energy consumed includes the energy consumption by batch, known as heat in the steel industry, for EAF and LMF, and the energy consumption for the rest of the plant in 15-minute intervals, although other time intervals may be used.

The steel mill uses scrap metal as a major raw material and recycles the scrap metal (e.g., factory trimmings). A heat refers to a production batch in an operation to melt scrap metal and convert into raw material. Melting the scrap metal is where most of the electrical energy is spent. One goal is to predict energy usage per hour, but the heat is the unit of operation of the mill, so the use of energy during the heat is predicted and then assigned to the corresponding hourly slots. A typical time for the complete processing of one heat is between 30 and 45 minutes, but it may vary.

The P dataset covers the program sequence schedule, including the planned start times of programs for the EAF, and the running status (ON or OFF) for the rest of the hot area and cold area (e.g., in hourly intervals).

The M dataset includes the planned scrap combination, burner gas, burner oxygen quantities to be used for the heats in P. Further, the C dataset stores the details for the target slab or coil, such as width, thickness, weight, plant details, steel grade, product type, etc. The O dataset includes the details on the operator and shift details in the schedule.

It is noted that the embodiments illustrated in FIG. 2 are examples and do not describe every possible embodiment. Other embodiments may utilize different database architecture, include ECR components at the steel mill, use other types of communications between the steel mill and the ECR backend, etc. The embodiments illustrated in FIG. 2 should therefore not be interpreted to be exclusive or limiting, but rather illustrative.

Energy predictions can be substantially enhanced by combining the ML methods discussed herein with metallurgical thermodynamically heat and mass balance estimations. These latter methods consider the thermodynamic properties of the input materials, mass quantities involved (including geometry), temperatures achieved, the metallurgical phase transformations occurring, and the thermodynamic efficiencies to estimate the energy required to bring about the material transformations required.

As one example, the energy required can be estimated thermodynamically, and the ML methods are then used to model the variations between the thermodynamic estimations and the actual energy required. This results in the ability to predict much more accurately with less data.

As another example, the various input variables and/or components of the thermodynamic estimation can be used as input features to the ML models employed. These thermodynamic-based features can be much more predictive with less data than simpler features.

Figure 3:
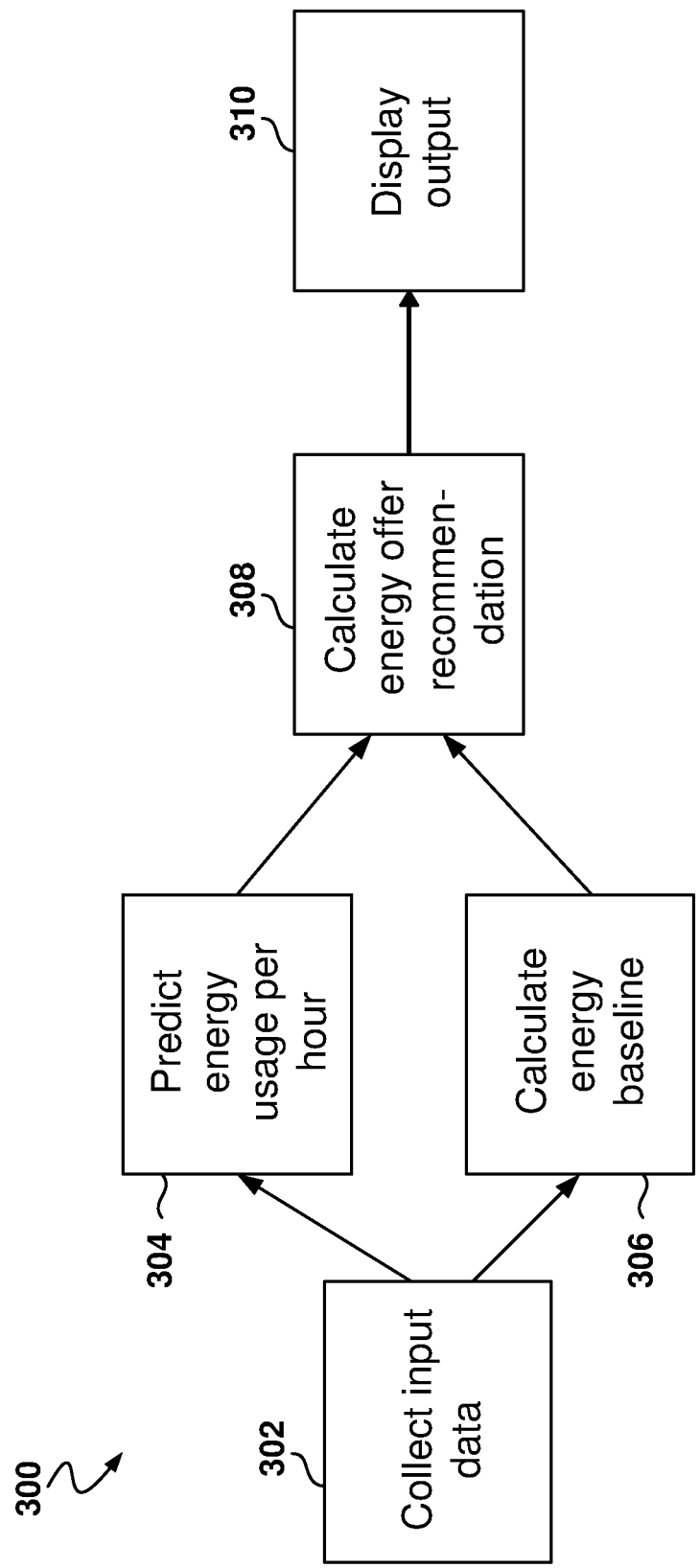
FIG. 3 is a flowchart of a method for providing a user interface to implement ECR features, according to some example embodiments.

FIG. 3 is a flowchart of a method 300 for providing a user interface to implement ECR features, according to some example embodiments. While the various operations in this flowchart are presented and described sequentially, one of ordinary skill will appreciate that some or all of the operations may be executed in a different order, be combined or omitted, or be executed in parallel.

At operation 302, the input data is collected. For example, the input data may include the E, P, M, C, and O datasets described above. After operation 302, operations 304 and 306 are performed.

At operation 304, the energy usage per hour at the steel mill is predicted. More details on operation 304 are provided below with reference to FIG. 4.

At operation 306, the energy baseline is calculated. In some example embodiments, the baseline is based on the average amount (plus or minus a certain percentage) of electricity used by the steel mill in the past, such as in the past week, month, quarter, year, etc. In other cases, more complex baseline calculations may be performed, such as based on usage percentiles, median use, standard deviation, or a combination thereof.

After the energy usage and the energy baselines are obtain, the method flows to operation 308 for calculating the energy offer recommendation, which is the amount of electricity recommended to be sold on one or more future periods of time (e.g., hourly). More details on the calculation of the energy offer recommendation are provided below with reference to FIG. 5.

At operation 310, the energy offer recommendation and other information are presented on a display, such as on a graphical user interface. Some examples of user interfaces are described below with reference to FIGS. 8-10.

Figure 4:
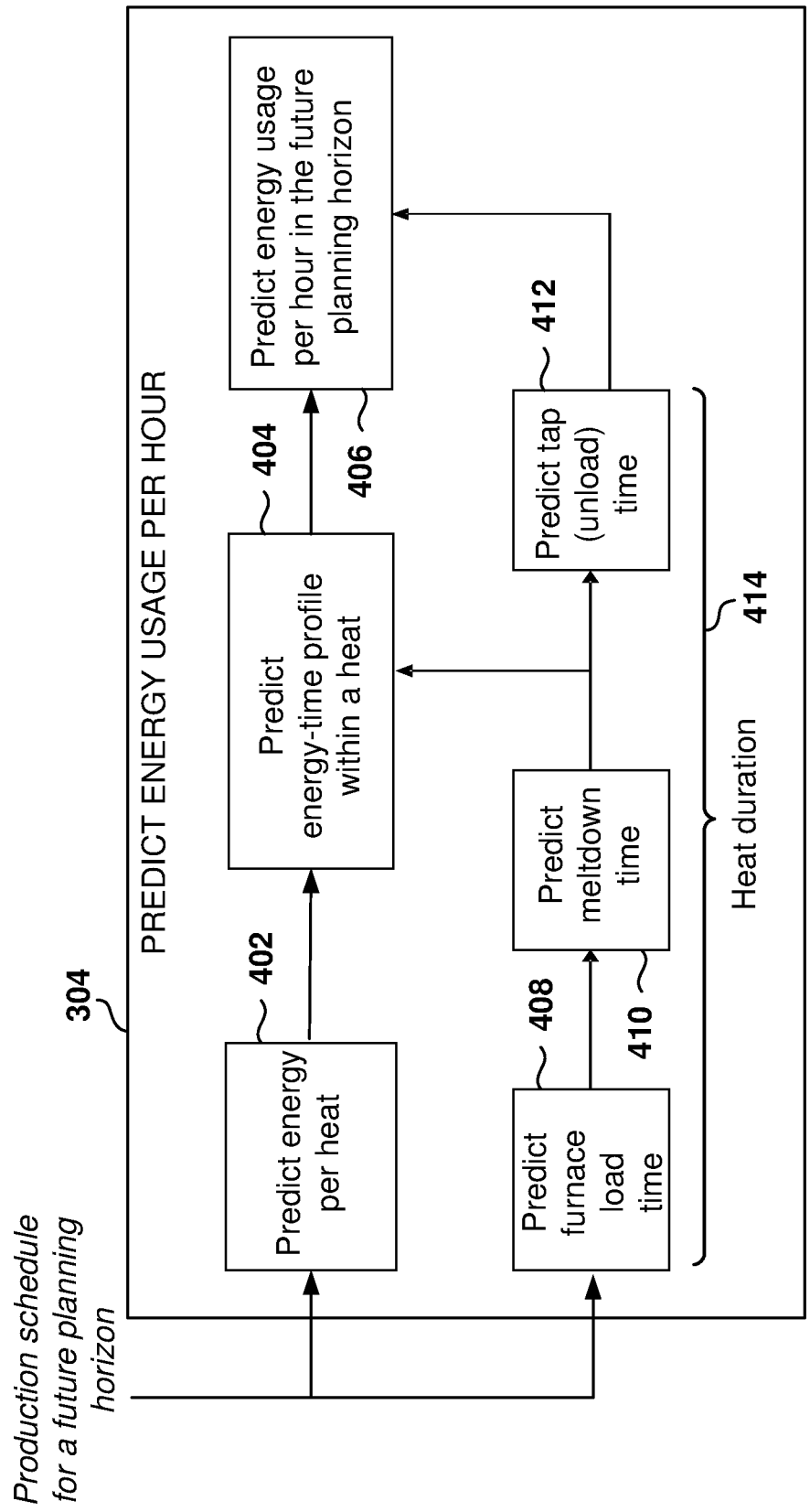
FIG. 4 is a flowchart of a method for predicting the energy usage per hour, according to some example embodiments.

FIG. 4 is a flowchart of a method 304 for predicting the energy usage per hour, according to some example embodiments. The production schedule for a future planning horizon is used as inputs to predict the energy per heat 402 and the heat duration 414.

At operation 402, the energy per heat is predicted using as an input the production schedule for a future planning horizon, that is a production schedule that includes at least a few hours. Further, at operation 404 the energy-time profile within the heat is predicted based on the predicted energy per heat, the furnace load time 408, and the meltdown time 410.

At operation 406, the energy usage per hour is predicted for the future planning horizon, which includes the energy usage for two or more hours (e.g., four hours, eight hours, 24 hours, this calendar day, next calendar day). Thus, the prediction of the energy usage is provided for each of the hours (or broken down by other type of interval) following a given time, such as the present time. The energy usage for each hour may then be used to determine if the energy should be sold for that particular hour, or if processes at the steel mill or the production schedule may be changed in order to change the future energy usage.

In some example embodiments, the heat duration 414 includes the predicted furnace load time, the predicted meltdown time, and the predicted tap time (i.e., unload time).

Although FIG. 4 illustrates the energy usage for one process, the energy per usage may be calculated for multiple processes, such as for the EAF and the LMF.

In some example embodiments, six machine-learning (ML) models are used to predict the different parameters. The ML models include EAF energy (Ee) (e.g., energy consumption by the EAF for each heat), EAF load time (Dlo), EAF melt time (Dm), EAF tap time (Dt), LMF energy (El) for each heat (i.e., energy consumption by the LMF for each heat), and LMF duration (Dl) (i.e., total duration of each LMF heat).

The total duration of each EAF heat (De) is calculated by adding Dlo, Dm, and Dt, as indicated in the equation below.

$$De = Dlo + Dm + Dt \tag{1}$$

Different ML models may be used, as discussed in more detail below with reference to FIG. 11, or a combination thereof. In some example embodiments, the accuracy metrics for each model are computed (e.g., Mean Absolute Error (MAE) and the Mean Absolute Percentage Error (MAPE)) to determine the performance of the ML models for making predictions in order to select the best ML models. In some example embodiments, gradient boosting machines where utilized.

It is noted that the embodiments illustrated in FIG. 4 are examples and do not describe every possible embodiment. Other embodiments may utilize different ML models, combine two ML models into one, or use additional or fewer models. The embodiments illustrated in FIG. 4 should therefore not be interpreted to be exclusive or limiting, but rather illustrative.

Figure 5:
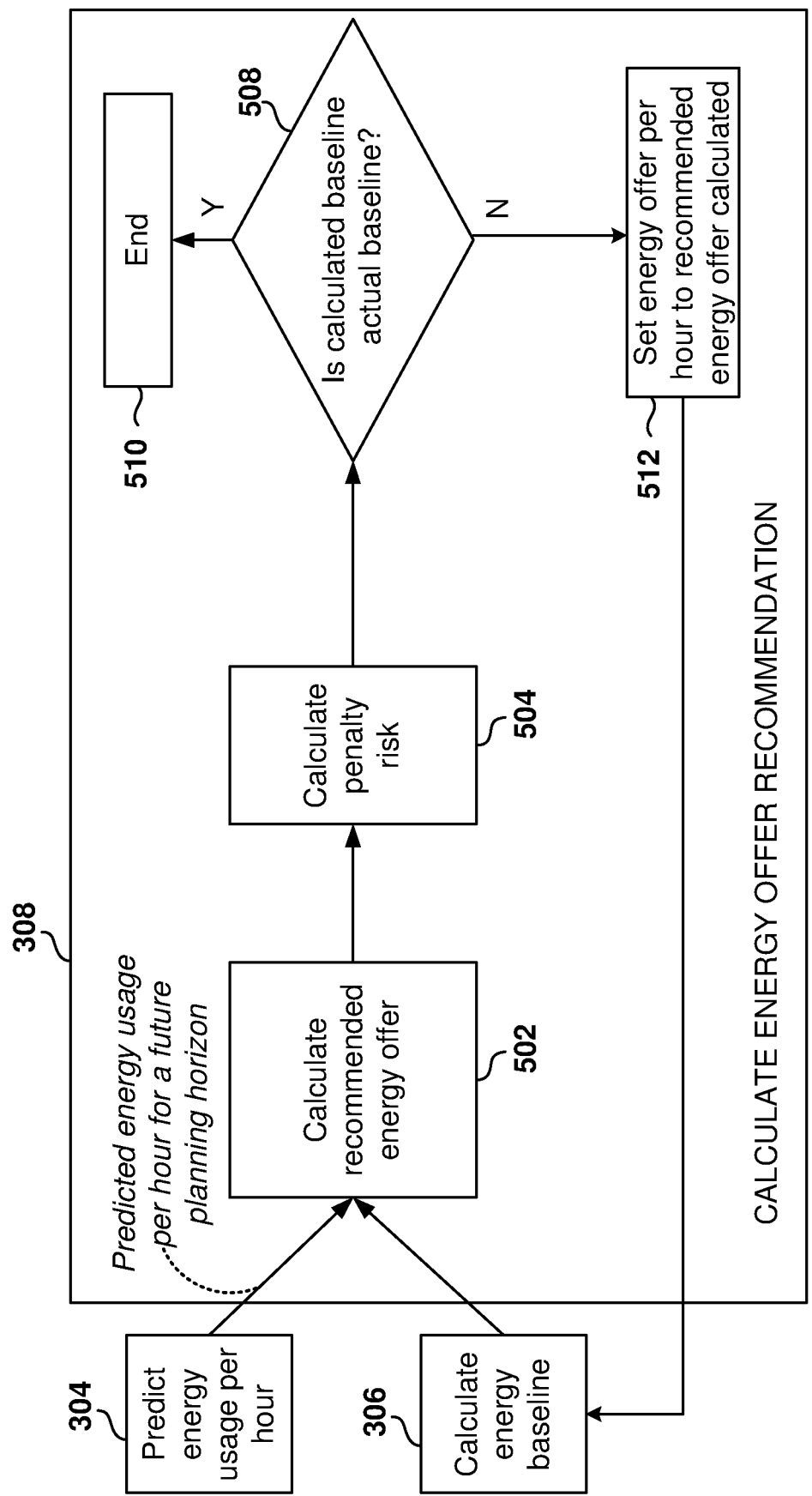
FIG. 5 is a flowchart of a method for calculating the energy-offer recommendation, according to some example embodiments.

FIG. 5 is a flowchart of a method 308 for calculating the energy-offer recommendation, according to some example embodiments. While the various operations in this flowchart are presented and described sequentially, one of ordinary skill will appreciate that some or all of the operations may be executed in a different order, be combined or omitted, or be executed in parallel.

In some example embodiments, calculating the energy-offer recommendation 308 utilizes the predicted energy usage per hour and the calculated energy baseline as inputs. At operation 502, the recommended energy offer is calculated, which is the amount of energy recommended to be placed for sale for each particular hour. It is noted that the recommended energy offer calculation depends on whether the calculated baseline is an actual baseline or maximum baseline, as described above. Thus, the amount of energy recommended maybe zero or more. Typically, the recommended energy offer will be between zero and the energy baseline, as selling above the energy baseline will not be possible according to the rules in the marketplace. More details are provided below with reference to FIG. 6 on embodiments for calculating the recommended energy offer.

R=revenue for an hour on a given day that energy has been offered for sale.

Q=penalty cost for an hour on the given day that energy has been offered for sale.

G=net revenue gain for selling on the hour of the given day=R−Q.

$E_B$=baseline energy usage amount for the hour (assumed to be greater than 0).

$E_A$=actual energy usage amount for that hour (greater than 0).

$E_F$=predicted energy usage amount for that hour (greater than 0).

$E_O$=energy amount offered for that hour.

$p_M$=market price per unit energy for that hour.

$p_O$=offered price per unit of energy set by the steel mill.

It is assumed that the steel mill is a small participant in the energy marketplace so offering $E_O$ at price $p_O$ (or within a threshold divergence ranges of $E_O$ and $p_O$) does not significantly influence the market price $p_M$. In other words, $p_M$ is externally determined by other market factors. Further, it is also assumed that the steel mill will be able to sell the energy offered in the bidding process if $E_O$ is offered at price $p_o$. This assumption may be relaxed in some cases, as discussed below.

Typically, the first-price auction mechanism used by energy marketplace operators (e.g., Midcontinent Independent System Operator, Inc. (MISO)) dictates that $p_O \leq p_M$. When $E_O=0$ (e.g., no energy offered for that hour), then there is no revenue nor penalty, thus the case when $E_O>0$ is analyzed. The revenue and penalty calculations are specified by the energy marketplace operator, applied to a market participant, when the participant is selected in an energy auction of a given hour.

The revenue R is calculated as follows:

$$R = \begin{cases} p_M \min(E_B - E_A, E'_O) + p_O[\max(E_B - E_A, E'_O) - E'_O] & , E_A < E_B \text{ and } E_O > 0 \\ 0 & , E_A \geq E_B \text{ and } E_O > 0 \end{cases} \quad (2)$$

At operation 504, the penalty risk is calculated. The penalty risk is the probability that a penalty will be assessed if the recommended energy offer is offered in the market place.

From operation 504, the method flows to operation 508 where a check is made to determine if the calculated baseline is the actual baseline or if the calculated baseline is the maximum baseline (i.e., not the actual baseline). In the latter case the actual baseline depends on what hours for which energy is sold and hence the method needs to wait for the user to enter the energy offer per hour. If the calculated baseline is the actual baseline, the method 308 ends. If the calculated baseline is not the actual baseline, the method flows to operation 512 where the energy offer per hour is set to the recommended energy offer calculated. From operation 512, the method flows back to operation 306 to recalculate the energy baseline after the user enters the energy offer per hour.

To determine the strategy for selling energy to the marketplace operator, the revenue gained by the steel mill and the penalty paid for overselling by the steel mill are calculated. A few parameter definitions are provided as follows:

Here, $E'_O$ is a slightly higher value of $E_O$ that includes a grace amount provided by the energy marketplace operator to partially compensate for the difficulty in forecasting how much energy will be available for selling. This grace amount is a fraction u of the offered amount, but subject to a minimum threshold $F_{min}$ and a maximum threshold $F_{max}$. $E'_O$ is calculated as follows:

$$E'_O = E_O + \min(\max(F_{min}, uE_O), F_{max}) \quad (3)$$

Sample values are u equal to 0.08, $F_{min}$ equal to 6 MW, and $F_{max}$ equal to 30 MW, but other values are also possible. Typically, $E_O$ is in the order of 100 MW and the grace amount is in the order of 10% or less. For now, this grace amount is ignored and the calculation of R may be expressed as:

$$R = \begin{cases} p_M \min(E_B - E_A, E_O) + p_O[\max(E_B - E_A, E_O) - E_O] & , E_A < E_B \text{ and } E_O > 0 \\ 0 & , E_A \geq E_B \text{ and } E_O > 0 \end{cases} \quad (4)$$

The penalty Q paid is calculated as follows:

$$Q = \begin{cases} p_M(E_A - E_B) & , E_A \geq E_B \text{ and } E_O > 0 \\ 0 & , E_A < E_B \text{ and } E_O > 0 \end{cases} \quad (5)$$

At the time of making an energy offer, $E_O$ is determined for each hour. Further, $E_B$ is calculated using the baseline algorithm used by the energy distributor. In one corner case (as discussed in operation 508 with reference to FIG. 5), $E_B$ depends on whether energy will be offered for sale in every hour of the day.

The optimal selling policy depends on whether $E_B$ is a known constant or whether $E_B$ depends on the hour for which energy is sold. Let's first analyze the optimal selling policy when $E_B$ is a known constant at offer time. For example, $E_B$ is a known constant when there is an adequate number of non-event days in the past 45-day window (5 for a weekday and 2 for a weekend or holiday), or when the plan is to offer energy in a single hour in the next day. $E_A$ is a random variable which is assumed to be known as a function of the forecasted energy usage $E_F$. ($E_A$ is specified below.)

The net gain for the hour G is calculated as R−Q. Therefore, G may be expressed as follows:

$$G = R - Q = \begin{cases} p_M \min(E_B - E_A, E_O) + p_O[\max(E_B - E_A, E_O) - E_O] & , E_A < E_B \text{ and } E_O > 0 \\ -p_M(E_A - E_B) & , E_A \geq E_B \text{ and } E_O > 0 \end{cases} \quad (6)$$

E(G) is the expected value of G, and E(G) is calculated as:

$$E(G) = P\{E_A < E_B\} E(G|E_A < E_B) + P\{E_A \geq E_B\} E(G|E_A \geq E_B) \quad (7)$$

One goal is to maximize E(G) as a function of $E_O$. When $E_A \geq E_B$, the optimal solution of $E_O$ (referred to $E_O^*$) is when $E_O^* = 0$, since by the calculation of G described above, G<0 and hence E(G)<0 for any value of $E_O > 0$. Then the optimal solution of G (G*) is for G*=0 and hence $E(G^*|E_A \geq E_B) = 0$.

When $E_A < E_B$ and $E_O > 0$, then $E_O^* > (E_B - E_A)$, by comparing the cases where $E_O > (E_B - E_A)$ and $E_O < (E_B - E_A)$ in the equation for calculating G. Then, $G^* = p_M(E_B - E_A)$, which is independent of $E_O$. Thus, it is determined that $E_O^* = E_B$, and $E(G^*|E_A < E_B) = p_M(E_B - E(E_A|E_A < E_B))$. Additionally, when $E_A < E_B$, if we set $E_O = 0$, then $E(G|E_A < E_B) = 0 \leq p_M(E_B - E(E_A|E_A < E_B))$. Hence, we can take the solution in the sub-case of $E_A < E_B$ and $E_O > 0$ as the overall solution for the case of $E_A < E_B$.

By combining the two cases where $E_A \geq E_B$ and $E_A < E_B$, it can be observed that there are only two choices of $E_O$: $E_O$ is 0 or $E_O$ is equal to $E_B$. If $E_B$ is blindly offered for every hour, the expected gain E(G) from selling one hour (e.g., one realization of $E_A$) is:

$$E(G) = P\{E_A < E_B\} E(G|E_A < E_B) + P\{E_A \geq E_B\} E(G|E_A \geq E_B) = \quad (8)$$

$$(1 - \alpha) p_M [E_B - E(E_A | E_A < E_B)] -$$

$$\alpha p_M [E(E_A | E_A \geq E_B) - E_B] \text{ where } \alpha = 1 - P\{E_A < E_B\} = P\{E_A \geq E_B\}$$

When the distribution of $E_A$ is far below the constant $E_B$, then $\alpha = P\{E_A \geq E_B\} \approx 0$ and E(G) is strictly positive. In a series of scenarios where the distribution of $E_A$ moves to the right and starts overlapping with the constant $E_B$, then $\alpha$ increases from 0 towards 1, and E(G) decreases and becomes negative at some point. The optimal action is to offer $E_B$ when E(G)>0 and to offer 0 when E(G)≤0. This means that the cutoff value of $\alpha$ is at E(G)=0. Let $\alpha^*$ denote the cutoff value of $\alpha$, then:

$$E(G) = 0 \Leftrightarrow (1-\alpha^*) p_M [E_B - E(E_A|E_A < E_B)] - \alpha^* p_M [E(E_A|E_A \geq E_B) - E_B] = 0 \quad (9)$$

Thus, $\alpha^*$ is calculated as:

$$\alpha^* = \frac{E_B - E(E_A \mid E_A < E_B)}{E(E_A \mid E_A \geq E_B) - E(E_A \mid E_A < E_B)} \quad (10)$$

The optimal selling policy is then expressed as follows:

$$E_O = \begin{cases} E_B & , \text{ if } P\{E_A < E_B\} > 1 - \alpha^* \\ 0 & , \text{ otherwise} \end{cases} \quad (11)$$

To calculate $P\{E_A < E_B\}$, $E(E_A|E_A < E_B)$ and $E(E_A|E_A \geq E_B)$, it is assumed that $E_A$ is a random variable having a normal distribution function with a mean equal to the forecasted hourly energy usage $E_F$ and a standard deviation equal to the historical root mean squared error (RMSE) of the energy prediction. The RMSE may be dependent on the forecast lead time L, where L is such that at time t, the energy usage of hour ending at [t+L+1] is forecasted.

Further, additional parameters are defined as follows:

$\Phi(x)$=the standard normal distribution function.

$N(x; \mu, \sigma)$=a normal distribution function with mean $\mu$ and standard deviation $\sigma$.

X=a random variable with distribution $\Phi(x)$.

Y=a random variable with distribution $N(x; \mu, \sigma)$.

Further, a and b are known constants.

The probability $P\{E_A < E_B\}$ may be expressed as:

$$P\{E_A < E_B\} = N(E_B; E_F, RMSE(L)) \quad (12)$$

Further, it is straightforward to calculate the following:

$$E(X \mid X \geq a) = \frac{1}{\sqrt{2\pi}(1 - \Phi(a))} e^{-\frac{a^2}{2}} \quad (13)$$

$$E(X \mid X < a) = -\frac{1}{\sqrt{2\pi}\Phi(a)} e^{-\frac{a^2}{2}} \quad (14)$$

Since $Y = \mu + \sigma X$, using equation (13) we obtain the following:

$$E(Y \mid Y \geq b) = E(\mu + \sigma X \mid (\mu + \sigma X) \geq b) = \quad (15)$$

$$\mu + \sigma E\left(X \mid X \geq \frac{b - \mu}{\sigma}\right) = \mu + \frac{\sigma}{\sqrt{2\pi}\left[1 - \Phi\left(\frac{b-\mu}{\sigma}\right)\right]} e^{-\frac{(b-\mu)^2}{2\sigma^2}}$$

Further, using (14), it can be derived:

$$E(Y \mid Y < b) = E(\mu + \sigma X \mid (\mu + \sigma X) < b) = \quad (16)$$

$$\mu + \sigma E\left(X \mid X < \frac{b - \mu}{\sigma}\right) = \mu - \frac{\sigma}{\sqrt{2\pi}\Phi\left(\frac{b-\mu}{\sigma}\right)} e^{-\frac{(b-\mu)^2}{2\sigma^2}}$$

Using (15) and (16) combined with (10), results in:

$$\alpha^* = \frac{E_B - E(E_A \mid E_A < E_B)}{E(E_A \mid E_A \geq E_B) - E(E_A \mid E_A < E_B)} \quad (17)$$

$$= \frac{E_B - E_F + \frac{RMSE}{\sqrt{2\pi} \Phi\left(\frac{E_B - E_F}{RMSE}\right)} e^{-\frac{(E_B - E_F)^2}{2RMSE^2}}}{\frac{RMSE}{\sqrt{2\pi}\left[1 - \Phi\left(\frac{E_B - E_F}{RMSE}\right)\right]} e^{-\frac{(E_B - E_F)^2}{2RMSE^2}} + \frac{RMSE}{\sqrt{2\pi} \Phi\left(\frac{E_B - E_F}{RMSE}\right)} e^{-\frac{(E_B - E_F)^2}{2RMSE^2}}}$$

$$= 1 - \Phi\left(\frac{E_B - E_F}{RMSE}\right) + \frac{\sqrt{2\pi}}{RMSE}(E_B - E_F)\Phi\left(\frac{E_B - E_F}{RMSE}\right)\left[1 - \Phi\left(\frac{E_B - E_F}{RMSE}\right)\right] e^{-\frac{(E_B - E_F)^2}{2RMSE^2}}$$

The optimal selling policy is then defined by (11), (12), and (17). It is noted that RMSE is typically a function of the energy prediction lead time L. Further, the expected gain by the steel mill using this optimal selling policy is calculated with equation (7):

$$E(G^*) = P\{E_A < E_B\}E(G^* \mid E_A < E_B) + P\{E_A \geq E_B\}E(G^* \mid E_A \geq E_B) = \quad (18)$$

$$(1 - \alpha^*)p_M[E_B - E(E_A \mid E_A < E_B)] -$$

$$\alpha^* p_M[E(E_A \mid E_A \geq E_B) - E_B] \text{ where } \alpha^* \text{ is given by (17)},$$

$$E(E_A \mid E_A < E_B) \text{ and } E(E_A \mid E_A \geq E_B) \text{ are given by}$$

(15) and (16) with $Y \sim N(.; E_F, RMSE(L))$ and $b = E_B$.

With respect to ignoring the grace amount in the revenue equation (4), it can be observed that the derivation of the optimal selling strategy will yield the same results without ignoring the grace amount.

Now, the assumption of always being selected if $E_O$ is offered at price $p_O$ for a particular hour is relaxed. The revenue calculation is conditioned on being selected for selling energy. The probability of being selected will be a function of $p_O$. Let's define the following:

$S(p_O)$=P{being selected in the bidding process when $p_O$ is the offer price}

$H(p_O)$=net gain for the hour, considering $S(p_O)$

The result of being selected or not has the following consequences:

a) If not selected, then the net gain for the hour is obviously zero.

b) If not selected for all hours in a day for which energy is offered, the day becomes a non-event day, even though it was intended to be an event day. This will impact the energy baseline calculation in the future 45 days and subsequently the selling policy and expected gain in those days. For simplicity of presentation, this secondary effect is ignored.

Then $E(H(p_O))$ can be calculated as follows:

$$E(H(p_O)) = S(p_O)E(H \mid \text{selected}) + (1 - S(p_O))E(H \mid \text{not selected}) = \quad (19)$$

$$S(p_O)E(G^*) + (1 - S(p_O)) * 0 =$$

$$S(p_O)E(G^*) \text{ where } E(G^*) \text{ is given by (18)}.$$

It is noted that $E(G^*)$ is independent of $p_o$. Further, $S(p_O)$ is a non-increasing function of $p_O$ since the bidding process is a first-price auction mechanism. Hence, to maximize $E(H(p_O))$, a very small offer price is set, that is, $p_O = \varepsilon > 0$ to ensure being selected, such that $E(H^*(p_O)) = S(\varepsilon)E(G^*)$.

In an auction where the goods will be sold to the highest price bidder, $S(\varepsilon) \approx 1$ as $\varepsilon \downarrow 0$. Hence, $E(H^*(p_O)) \approx E(G^*)$.

This also solves the issue of not being selected impacting the baseline calculation. However, in an energy marketplace, this may not be true since there may not be a need for the market to purchase energy for a given hour. In other words, $S(\varepsilon) < 1$ as $\varepsilon \downarrow 0$.

Assuming that the only reason for not being selected at a very small offer price is a lack of market need, independent of energy price, then $S(\varepsilon) = \delta$ which is externally determined. This reduces the optimal net gain to $E(H^*(p_O)) = \delta E(G^*)$.

However, the optimal selling policy remains the same, if the secondary effect, of a non-event day on the calculated baseline, is ignored.

Now, the optimal selling policy when $E_B$ depends on hours for which energy is sold is presented. The method to determine the optimal selling policy when $E_B$ depends on hours for which energy is sold includes the following five operations:

(i) For each hour in the planning horizon, calculate $E_B$ assuming that each hour is the only hour in the day for which energy will be sold.

(ii) For each hour in the planning horizon, calculate $E_O$ using the calculated $E_B$ and equations (11), (12), (17). Take note of the set of hours for which $E_O > 0$. Stop if there is no change in the set of hours for which $E_O > 0$ from the last iteration.

(iii) For each calendar day in the planning horizon, calculate the event time span which is the envelope of the hours for which $E_O > 0$ obtained in operation (ii).

(iv) Recalculate the actual baseline $E_B$ based on the event time span obtained in operation (iii).

(v) Go to (ii).

It is noted that the calculated selling amount $E_O$ is approximate in this case, since $E_B$ depends on hours for which energy is actually sold (i.e., dispatched), not just offered.

Figure 6:
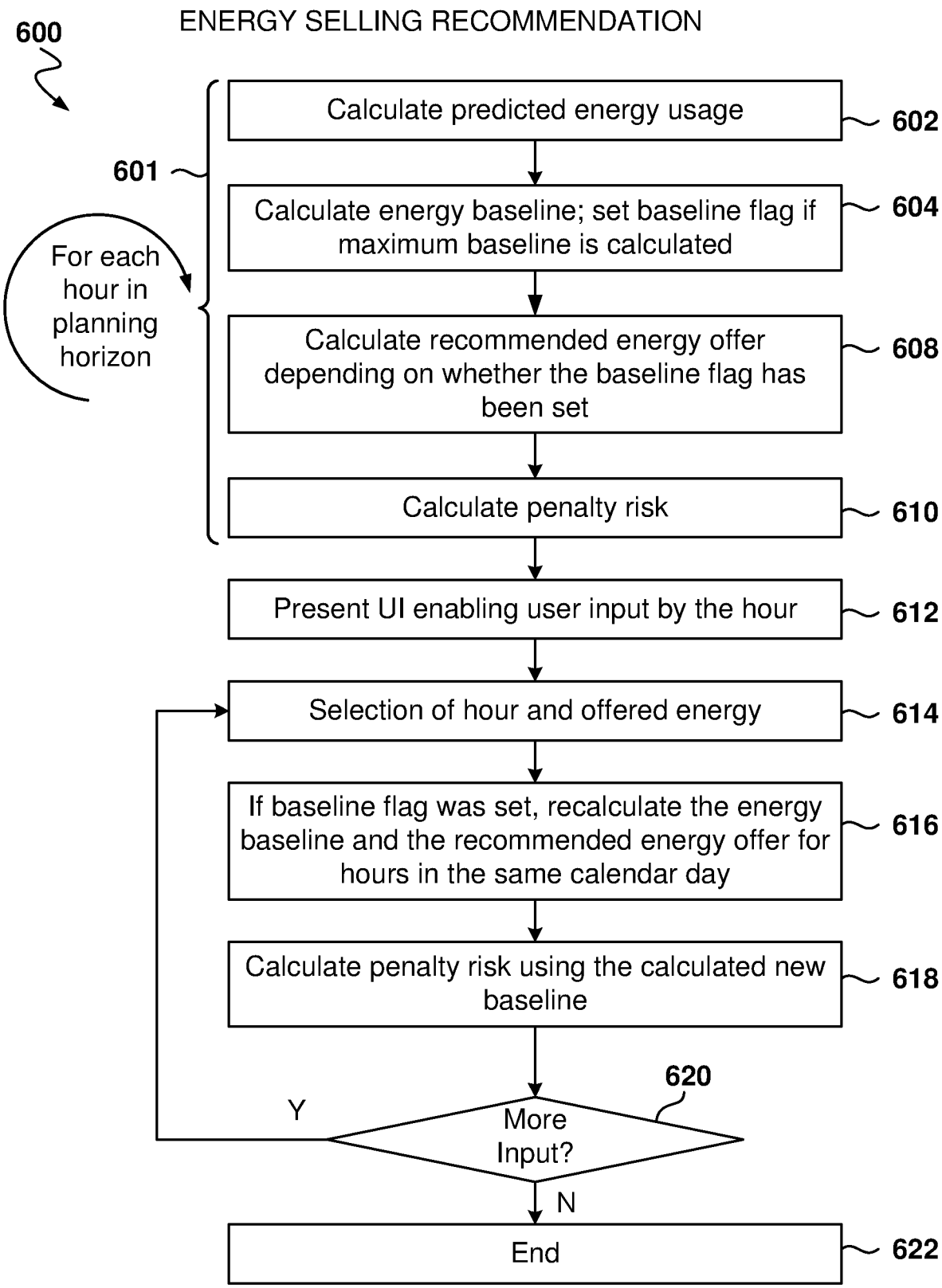
FIG. 6 is a flowchart of a method for providing a user interface to set energy-selling operations based on system recommendations, according to some example embodiments.

FIG. 6 is a flowchart of a method 600 for providing a user interface to set energy-selling operations based on system recommendations, according to some example embodiments. While the various operations in this flowchart are presented and described sequentially, one of ordinary skill will appreciate that some or all of the operations may be executed in a different order, be combined or omitted, or be executed in parallel.

At a predetermined time (e.g., the current time), for each hour in the planning horizon, as specified by the current production schedule, operation 601 is performed. Operation 601 includes operations 602, 604, 606, 608, and 610. It is noted that that method 600 is for hourly intervals, but other intervals may also be utilized.

At operation 602, the predicted energy usage for the given hour is calculated. See for example, operation 304 described above with reference to FIG. 4. From operation 602, the method flows to operation 604 where the actual baseline is calculated. If the actual baseline requires selling hourly input, the maximum baseline is calculated instead at operation 604. Additionally, a baseline flag is set for those hours for which the maximum baseline is calculated.

From operation 604, the method flows to operation 608 where the recommended energy offer $E_O$ is calculated, depending on whether the baseline flag has been set, using the optimal selling policy when $E_B$, the energy baseline, is a known constant (i.e., an actual baseline) or when $E_B$ depends on the hours for which energy is sold (i.e., when the calculated baseline is a maximum baseline). This is described in operation 308 above.

From operation 608, the method flows to operation 610 to calculate the penalty risk. $E_A$ is a random variable assumed to have a normal distribution function with a mean equal to the forecasted hourly energy usage $E_F$ and a standard deviation equal to the historical RMSE of the energy prediction. The RMSE is dependent on the forecast lead time L, where L is such that, at a given time t, the energy usage of hour ending [t+L+1] is forecasted. Further, N(x; μ, σ) denotes the normal distribution function at x with mean μ and standard deviation σ. Then P{G<0} is calculated as follows:

$$P\{G<0\} = \begin{cases} \{E_A \geq E_B\} &, E_O > 0 \\ 0 &, E_O = 0 \end{cases} \quad (20)$$

At time t, given that energy is sold (e.g., $E_O>0$) for the hour ending [t+L+1], then the probability of paying a penalty is:

$$P\{E_A \geq E_B\}=1-P\{E_A < E_B\}=1-N(E_B;E_F,RMSE(L)) \quad (21)$$

After operation 601 is performed for each of the hours in the planning horizon, at operation 612, a graphical user interface is presented for enabling a user to select hour and energy offering for the selected hour. Some example screenshots of the graphical user interface are presented below with reference to FIGS. 8-10.

At operation 614, selections of an hour in a given calendar day and the offered energy for that hour are received via the user interface. The user interface presents the values of the recommended energy offer, the calculated baseline, and the calculated penalty risk to facilitate the selections by the user. For example, the user may accept the recommended energy offer for the selected hour, or the user may enter a different value.

From operation 614, the method flows to operation 616 where, if the baseline flag was set, the energy baseline is recalculated and then the recommended energy offer $E_O$ is recalculated for all the hours in the calendar day, using the optimal selling policy when $E_B$ is a constant.

At operation 618, the penalty risk is calculated using the newly calculated actual baseline. From operation 618, the method flows to operation 620 where a check is made to determine if additional input is expected from the user. Or in other words, the method continues receiving input from the user until the user selects to end entering inputs. If more inputs are to be received from the user, the method flows to operation 614, and to operation 622 otherwise to end the energy selling recommendation process.

In some example embodiments, the energy offered is automated and instead of waiting for a user to make decisions, the system automatically adjusts the energy offered for sale. In some example embodiments, the automated system may also adjust the production scheduling to optimize the total revenue of selling the produced products and selling energy, taking into consideration other expenses that might be derived from changing the production schedule.

In some example embodiments, the recommendation for energy offered is calculated as described above and the system adjusts the calculated recommendation, for example as follows. Fine-tuning parameters may be set by the user to limit the maximum amount of energy offered, the changes to the production scheduled (if any), and a margin of safety to decrease the actual amount of energy offered. The ability of the system to make automatic recommendations may be turned on or off by the user.

In some example embodiments, a machine learning model is used to determine the ultimate energy offered for sale. The ML model may be fine-tuned over time by using as features the actual values of energy offered, the energy bought by the system, penalties incurred, time of the day, calendar day, amount of energy bought and sold on the market, evolution of supply and demand over time, etc. The ML model is then retrained periodically with the additional performance values.

Figure 7:
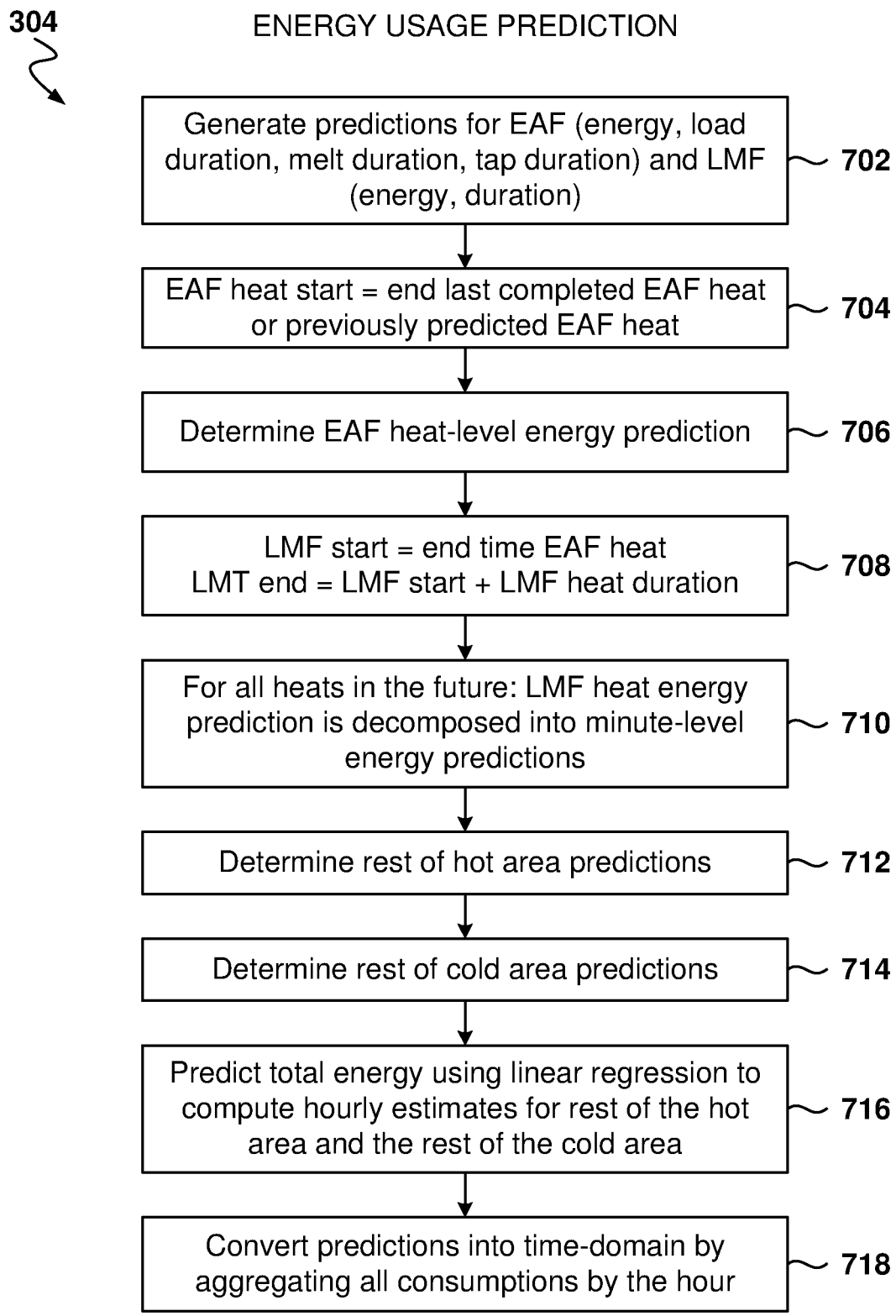
FIG. 7 is if flowchart of a method for predicting energy usage, according to some example embodiments.

FIG. 7 is if flowchart of a method 304 for predicting energy usage, according to some example embodiments. While the various operations in this flowchart are presented and described sequentially, one of ordinary skill will appreciate that some or all of the operations may be executed in a different order, be combined or omitted, or be executed in parallel.

At operation 702, predictions are generated for all heats in the future using six algorithms to get EAF energy, LMF energy, EAF load duration, EAF melt duration, EAF tap duration, and LMF duration, using the modelling strategy described above. Some of these algorithms are of the machine-learning-algorithm type (e.g., those for predicting EAF energy, LMF energy, EAF melt duration, LMF duration). More details on machine learning algorithms are described later with reference to FIG. 11. As described earlier, these ML algorithms may be combined with thermodynamic factors to improve predictive capability. For example, the combined models can be used to improve energy prediction for the EAF and LMF.

At operation 704, the end time of the last completed EAF heat (Hl) is used as the start time for the first predicted EAF heat (Hl+1). The end time for Hl+1 is computed using the Dlo, Dm and Dt values computed at operation 702. The next heat (Hl+2) is given the start time equal to the end time of (Hl+1) and the same process is repeated to get the predicted schedule for the desired future EAF heats.

At operation 706, the EAF heat-level energy prediction is determined. For all the heats in the future, the heat-level energy prediction for EAF (Ee) is decomposed into minute-level energy predictions using the following logic:

During load time, EAF consumes 0 kWh of energy.

During melt time, all of the energy consumption happens during the melt time, therefore, the energy Ee needs to be distributed throughout the melt duration Dm. The distribution of the energy is decomposed in parts (a)-(c) as follows:

(a) During ramp-up: the ramp-up duration Dmu is set based on previous experience and typical usage (e.g., 3 minutes). In some example embodiments, the amount of energy consumed during ramp-up Eu is computed using the median values of historical heats in the training data for those ramp-up durations.

(b) Ramp-down: the ramp-down duration Dmd is set based on previous experience and typical usage (e.g., 3 minutes). In some example embodiments, the amount of energy consumed during ramp-down Ed is computed using the median values of historical heats in the training data for those ramp-down durations.

(c) Steady state: to approximate the steady state nature of the middle phase, a uniform distribution is applied on the remainder of the energy. The remaining energy Ess (Ess=Ee−Eu−Ed) is uniformly distributed per minute for this steady state duration Dmss (Dmss=Dm−Dmu−Dmd). In some example embodiments, a machine learning algorithm such as time series clustering is used to classify the energy usage profile of the middle phase into distinct clusters and the centroid of each cluster is used as the profile for the heats classified into that cluster.

During tap time, the EAF consumes 0 kWh of energy.

From operation 706, the method flows to operation 708, where every LMF heat is set to immediately succeed its corresponding EAF heat. Consequently, the start time of the LMF heat is pegged to the end time of the preceding EAF heat. The end time for the LMF heat is computed using its predicted Dl duration.

At operation 710, for all the heats in the future, the heat-level energy prediction for LMF (El) is decomposed into minute-level energy predictions. A uniform distribution is applied on the total predicted energy El for its entire predicted duration Dl. In some example embodiments, time series clustering is used to classify the energy usage profile of the LMF into distinct clusters and the centroid of each cluster is used as the profile for the heats classified into that cluster. Based on the values calculated, a complete timeline is generated for all the scheduled heats.

At operation 712, the consumption for the rest of the hot area is predicted. For example, caster and HSM consume approximately a fixed amount of energy per hour when in active operations. Additionally, their energy consumption is also dependent on the volume of steel processed. In some example embodiments, the energy consumption for these areas is determined in 15-minute intervals.

At operation 714, the prediction for the rest of the cold area is determined. PL, TCM, CGL, BAF, and HSF consume approximately a fixed amount of energy per hour in active operations. Their energy consumption also depends on the volume of steel processed. In some example embodiments, the energy consumption for these cold areas is available in 15-minute intervals.

At operation 716, the total energy for the entire steel mill is predicted. In some example embodiments, to predict energy for the entire mill, a linear regression algorithm is used to compute hourly estimates for the rest of the hot area and the rest of the cold area based on their planned schedules in the future and the tonnage that is to be processed. The inputs to this algorithm include energy consumption per hour, volume of steel processed by plant (tonnage), and the production schedule. This model is used to generate hourly forecasts for the rest of the hot area (ERH) and rest of the cold area (ERC) based on the production schedule of a future time horizon.

At operation 718, the energy predictions are converted into the time domain by aggregating all the consumptions by the hour. This operation to compute hourly predictions is done as the energy markets typically operate at an hourly level. The energy supply offers must be submitted for every hour on a given day by the energy trader and the application is able to provide this information.

Figure 8:
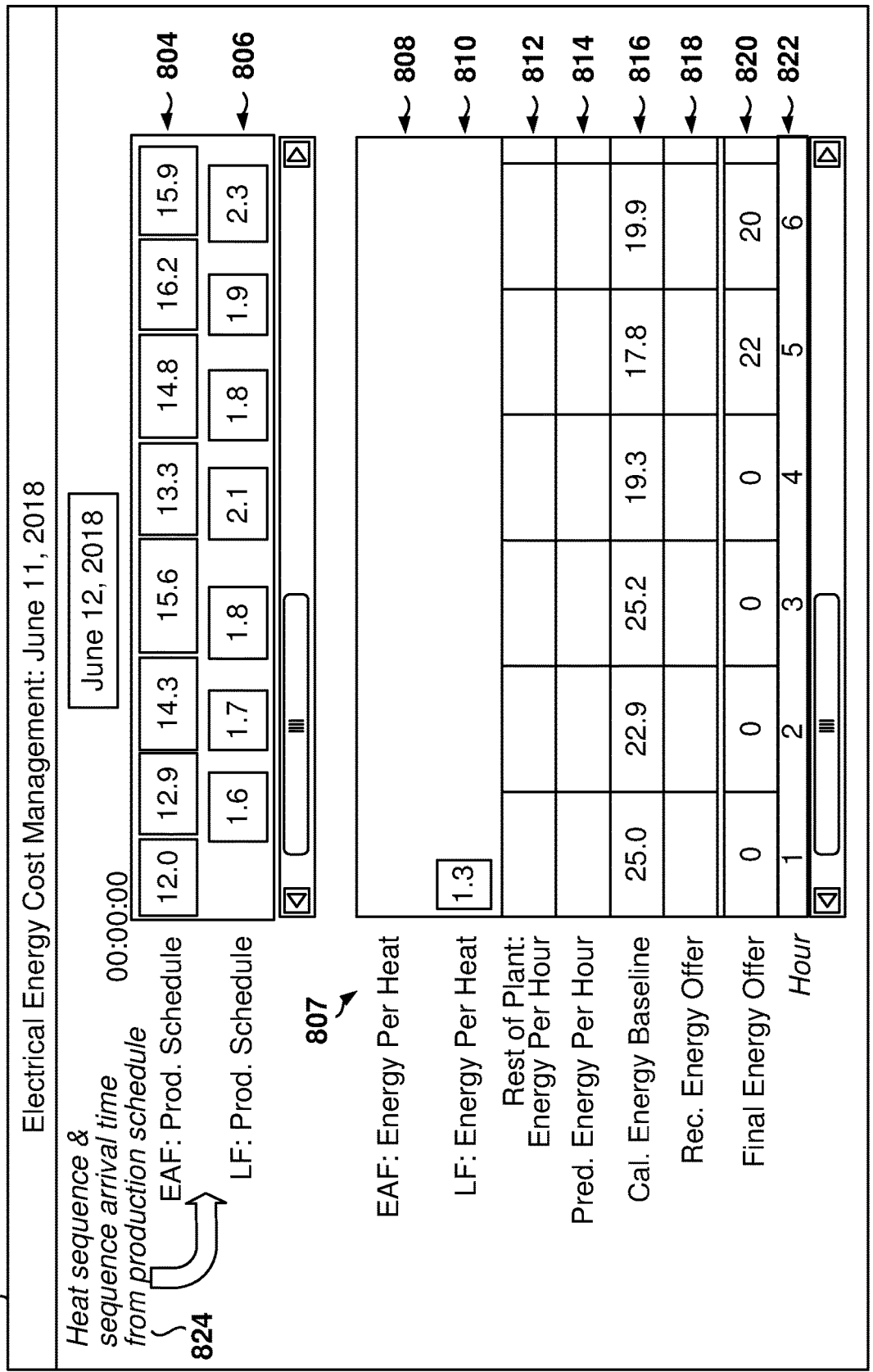
FIG. 8 is a user interface for viewing energy usage based on the production schedule and for selecting energy offerings, according to some example embodiments.

FIG. 8 is a user interface 802 for viewing energy usage based on the production schedule and for selecting energy offerings, according to some example embodiments. The user interface 802 provides information for the EAF and the LMF but other embodiments may include additional processes.

The EAF production schedule 804 includes boxes for the different heats sorted by time. Inside each heat, a number is presented indicating the predicted energy usage for that heat. The LMF processes 806 follow the EAF processes and each box represents the duration for the LMF and a number with the predicted energy usage.

The EAF production schedule 804 and the LMF production schedule 806 are filled based on the heat sequence and sequence arrival time from the production schedule.

A planning window 807 is presented below the EAF and LMF processes and allows the user to configure actual parameters in order to set the final energy offer 820. The planning window 807 includes the selected EAF heats 808, the selected LMF heats 810, the rest of the plant predicted energy for the hour 812, the total predicted energy per hour 814, the calculated energy baseline 816, the recommended energy offer 818, the final energy offer 820, and the timescale 822. The planning window 807 includes hourly slots, but other embodiments may use different time periods.

The user may transfer one of the heats from the top to the planning window 807 to set the EAF heats 808 on the LMF heats 810. As these values are set at the planning window 807, the other parameters are filled in by the system, including that recommended energy offer 818. The user may then enter the final energy offer 820 for offer to the energy market.

Figure 9:
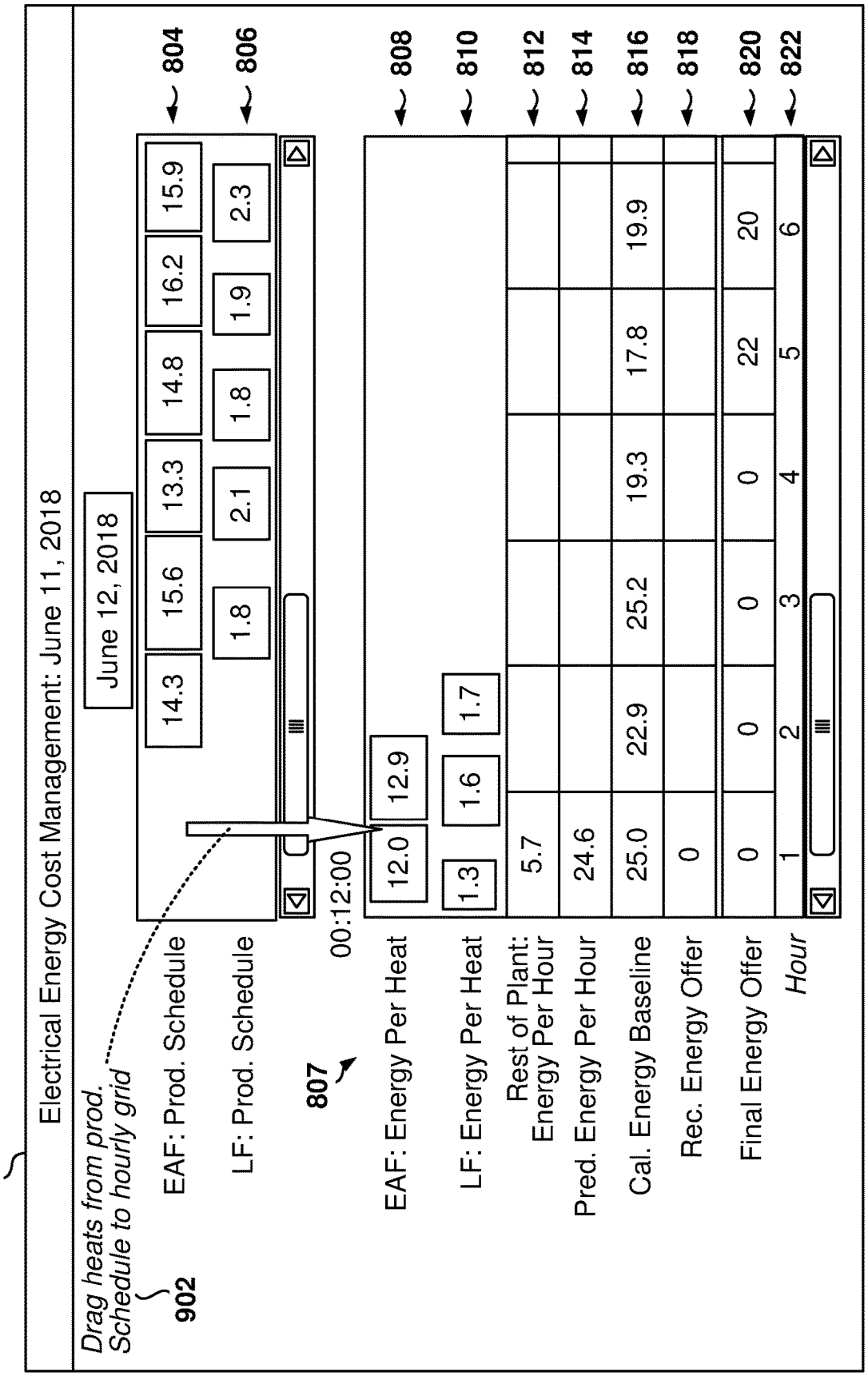
FIG. 9 illustrates the operation of the user interface for dragging from the production schedule to the hourly grid, according to some example embodiments.

FIG. 9 illustrates the operation of the user interface for dragging from the production schedule to the hourly grid, according to some example embodiments. As the user drags (e.g., with a mouse) 902 heats from the production schedule to the hourly grid in the planning window 807, the values in the planning window 807 are filled in by the ECR system. After the heats are dragged to the planning window 807, the user can move the heats forwards or backwards according to his knowledge of when the heats will start.

FIG. 9 illustrates the evolution of the planning window 807 after the user drags 902 heats from the production schedule to the planning window 807. The EAF heats 808 and the LMF heats 810 are updated, as well as the predicted energy per hour (rest of plant and total) and recommended energy offer.

The planning window 807 shows how the rest of the plant energy per hour 812 is predicted to be 5.7 for the first hour, total predicted energy per hour is 24.6 for the first hour, etc.

Figure 10:
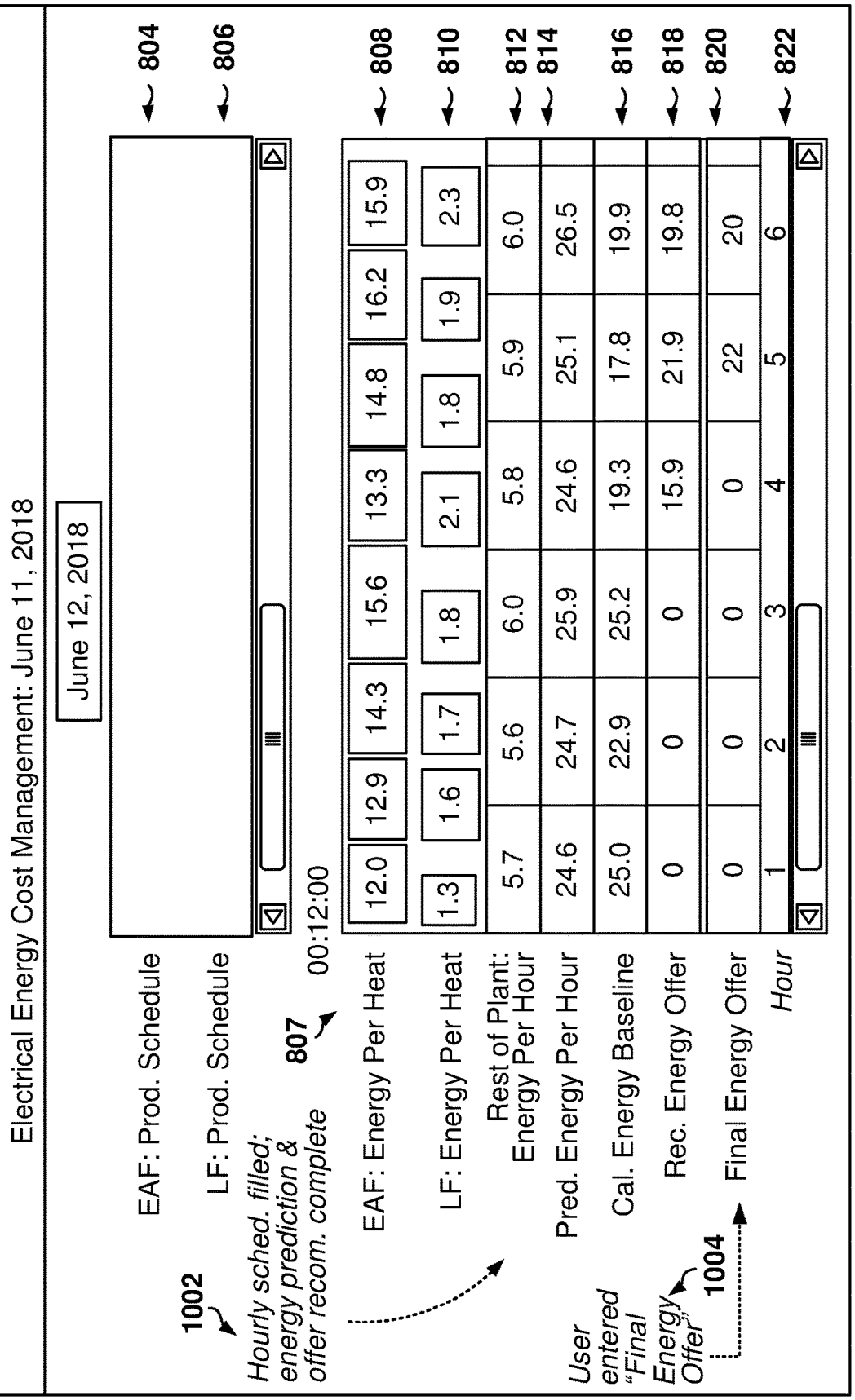
FIG. 10 illustrates the operation of the user interface for entering the final energy offer, according to some example embodiments.

FIG. 10 illustrates the operation of the user interface for entering the final energy offer, according to some example embodiments. As the user continues to schedule the heats, the parameters in the planning window 807 are filled out. Once the schedule is determined for a few hours in the future (e.g., fill in the calendar day or some other period of time), then the row of recommended energy offer 818 is completed 1002.

The user enters 1004 the final energy offer 820. In the exemplary embodiment of FIG. 10, the recommended energy offer is zero for the first three hours and the recommended energy offers for the next three hours are 15.9, 21.9, and 19.8. In this example, the user has decided to skip offering energy at hour 4 and make energy offers of 22 and 20 at hours 5 and 6 respectively.

It is noted that the embodiments illustrated in FIGS. 8-10 are examples and do not describe every possible embodiment. Other embodiments may utilize different window formats, use additional or fewer fields: include additional options, etc. The embodiments illustrated in FIGS. 8-10 should therefore not be interpreted to be exclusive or limiting, but rather illustrative.

Figure 11:
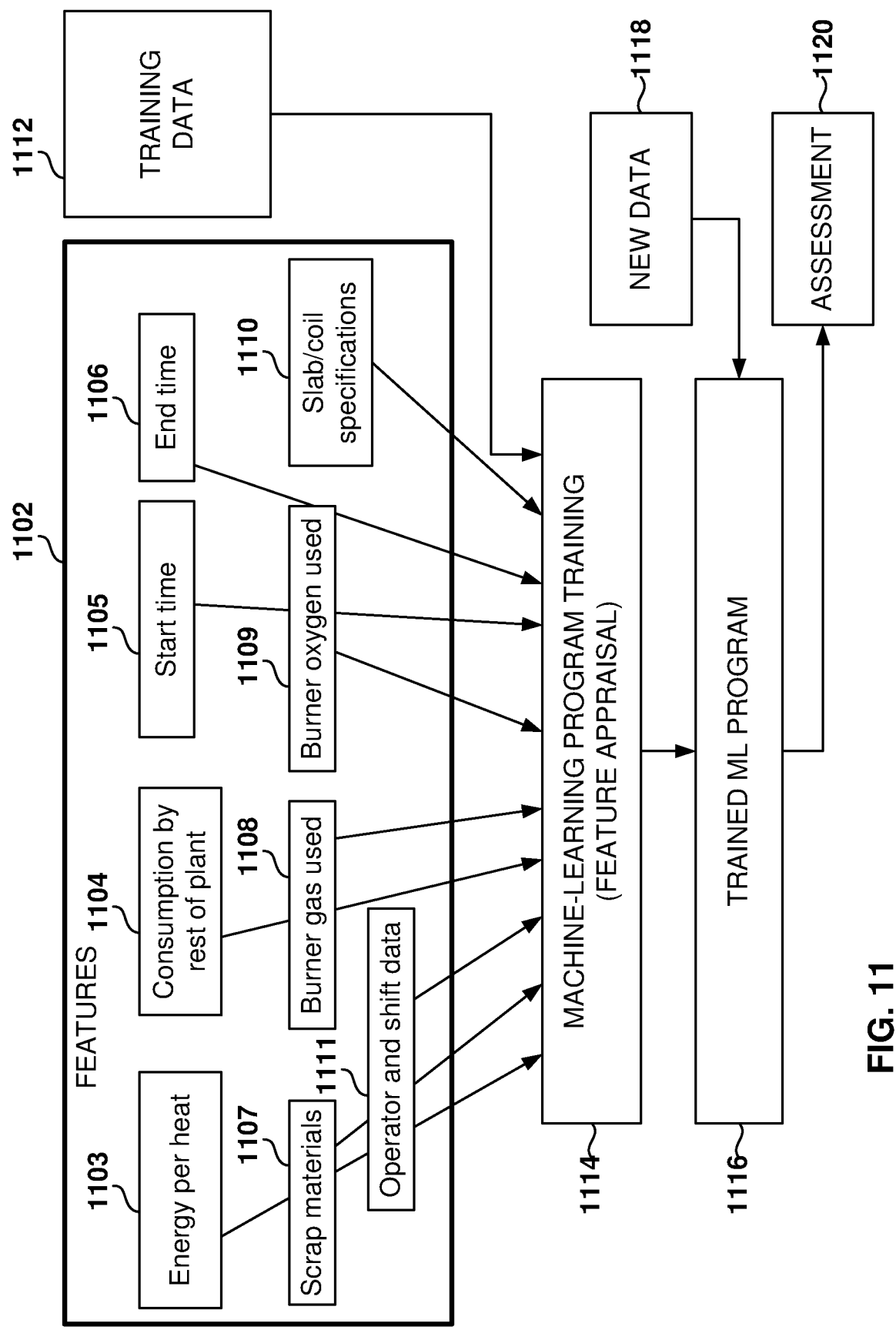
FIG. 11 illustrates the training and use of a machine-learning program, according to some example embodiments.

FIG. 11 illustrates the training and use of a machine-learning program, according to some example embodiments. In some example embodiments, machine-learning programs (MLPs), also referred to as machine-learning algorithms or tools, are utilized to perform operations associated with searches, such as job searches.

Machine learning is a field of study that gives computers the ability to learn without being explicitly programmed Machine learning explores the study and construction of algorithms, also referred to herein as tools, that may learn from existing data and make predictions about new data. Such machine-learning tools operate by building a model from example training data 1112 in order to make data-driven predictions or decisions expressed as outputs or assessments 1120. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), gradient boosted trees, gradient boosting machines, neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number). In some embodiments, example machine-learning algorithms for regression are used for the EAF energy Ee, the EAF load time Dlo, the EAF melt time Dm, the EAF tap time Dt, the LMF energy El for each heat, and the LMF duration Dl. In some embodiments, example machine-learning algorithms for classification are used for the EAF energy profile in the middle phase and the LMF energy profile. In other embodiments, additional ML algorithms may be utilized, such as an ML algorithm to automatically calculate and implement the recommended energy offering by the hour. The machine-learning algorithms utilize the training data 1112 to find correlations among identified features 1102 that affect the outcome.

The machine-learning algorithms utilize features 1102 for analyzing the data to generate assessments 1120. A feature 1102 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

In one example embodiment, the features 1102 may be of different types and may include one or more of energy per heat 1103, consumption by the rest of the plant 1104, start time of the heat 1105, end time of the heat 1106, information about scrap materials (e.g., weight) 1107, burner gas used 1108, burner oxygen used 1109, slab/coil specifications 1110, operator and shift data 1111.

The machine-learning algorithms utilize the training data 1112 to find correlations among the identified features 1102 that affect the outcome or assessment 1120. In some example embodiments, the training data 1112 includes labeled data, which is known data for one or more identified features 1102 and their corresponding one or more outcomes, such as predicting the durations of the heats for the EAF and LMF, or calculating energy offerings.

With the training data 1112 and the identified features 1102, the machine-learning tool is trained at operation 1114. The machine-learning tool appraises the value of the features 1102 as they correlate to the outcomes in the training data 1112. The result of the training is the trained machine-learning program 1116.

When the machine-learning program 1116 is used to perform an assessment, new data 1118 is provided as an input to the trained machine-learning program 1116, and the machine-learning program 1116 generates the assessment 1120 as output. For example, when a new production schedule is received, the durations of the different phases of each heat are calculated.

Figure 12A:
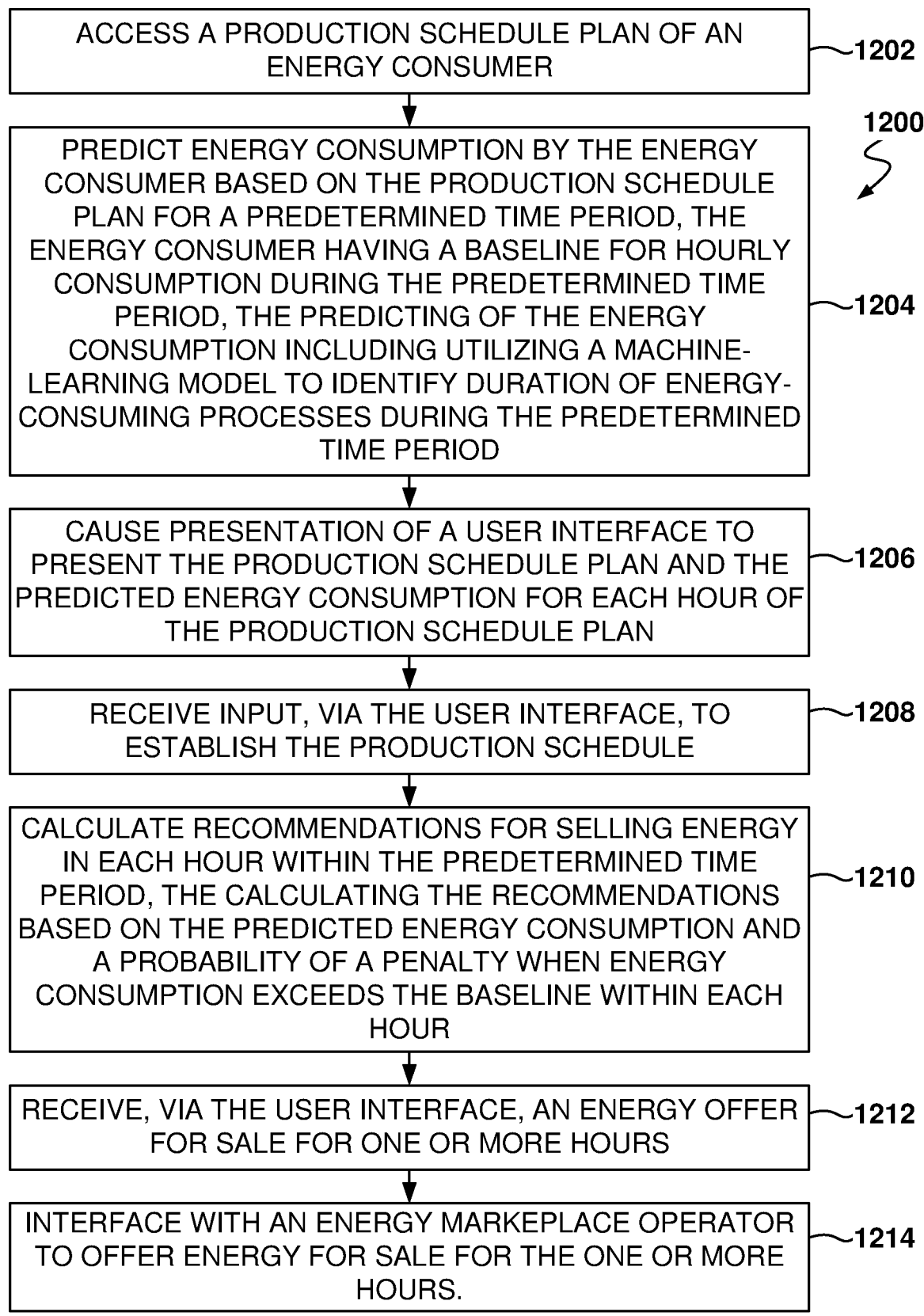
FIG. 12A is a flowchart of a method for managing energy usage based on predicted consumption, according to some example embodiments.

FIG. 12A is a flowchart of a method 1200 for managing energy usage based on predicted energy consumption, according to some example embodiments. While the various operations in this flowchart are presented and described sequentially, one of ordinary skill will appreciate that some or all of the operations may be executed in a different order, be combined or omitted, or be executed in parallel.

At operation 1202, one or more processors access a production schedule plan of an energy consumer. From operation 1202, the method flows to operation 1204 for predicting, by the one or more processors utilizing a machine-learning model, energy consumption by the energy consumer based on the production schedule plan for a predetermined time period. The energy consumer has a baseline for hourly consumption during the predetermined time period, where predicting the energy consumption includes utilizing a machine-learning model to identify duration of energy-consuming processes during the predetermined time period.

From operation 1204, the method flows to operation 1206 for causing presentation, by the one or more processors, of a user interface to present the production schedule plan and the predicted energy consumption for the production schedule plan.

At operation 1208, input is the received, via the user interface, to establish the production schedule, and at operation 1210, based on the established production schedule, the one or more processors calculate recommendations for selling energy in each hour within the predetermined time period. Calculating the recommendations is based on the predicted energy consumption and a probability of a penalty when energy consumption exceeds the baseline within each hour.

From operation 1210, the method flows to operation 1212 for receiving, via the user interface, an energy offer for sale for one or more hours. Operation 1214 is for interfacing with an energy marketplace operator to offer the energy offer for sale for the one or more hours.

In one example, predicting the energy consumption includes predicting an amount of energy and the time duration for processing each heat in the production schedule plan, predicting an energy-time profile within each heat, and predicting an energy usage per hour during the predetermined time period.

In one example, the user interface provides an option to drag a heat from the production schedule plan to an actual time schedule.

In one example, predicting the energy consumption includes determining energy consumed by a rest of the plant during the heat.

In one example, calculating recommendations for selling energy in each hour includes calculating an energy offer recommendation for each hour based on the penalty, the baseline, a predicted energy usage for the hour, a market price for unit of energy, and an offer price for unit of energy.

In one example, the revenue from selling energy includes a grace amount provided by the energy marketplace operator to compensate for difficulty in forecasting energy available for selling.

In one example, calculating recommendations for selling energy includes calculating a probability that an actual energy usage amount for the hour is greater than a baseline energy usage amount for the hour.

In one example, predicting the energy consumption includes generating predictions for Electric Arc Furnace (EAF) and a Ladle Metallurgical Furnace (LMF) considering that each heat is started after a previous heat ends.

In one example, predicting the energy consumption includes predicting energy consumption for a rest-of-hot area, and predicting energy consumption for a rest-of-cold area.

In one example, predicting the energy consumption includes utilizing a linear regression model to compute hourly energy consumption estimates for the rest-of-hot area and the rest-of-cold area.

In one example, the energy consumption associated with a systematically-determined set of possible alternative schedules or sequencing patterns, is used to determine an improved schedule, or set of sequence options, based on the total energy consumed, and optionally other variables such as order delivery times, material waste, and others.

In another example, energy consumption associated with small, within-tolerance changes in output (such as thickness and width, impurity levels, alloy levels, coating thickness, and so on) is estimated, and then improved or optimized targets for these changes is determined and set via the control systems.

In some example embodiments, a system that includes a memory comprising instructions and one or more computer processors. The instructions, when executed by the one or more computer processors, cause the one or more computer processors to perform operations comprising: accessing a production schedule plan of an energy consumer; predicting energy consumption by the energy consumer, utilizing a machine-learning model, based on the production schedule plan for a predetermined time period, the energy consumer having a baseline for hourly consumption during the predetermined time period, the predicting of the energy consumption including utilizing a machine-learning model to identify duration of energy-consuming processes during the predetermined time period; causing presentation of a user interface to present the production schedule plan and the predicted energy consumption for each hour of the production schedule plan; receiving input, via the user interface, to establish the production schedule; based on the established production schedule, calculating recommendations for selling energy in each hour within the predetermined time period, the calculating the recommendations based on the predicted energy consumption and a probability of a penalty when energy consumption exceeds the baseline within each hour; receiving, via the user interface, an energy offer for sale for one or more hours; and interfacing with an energy marketplace operator to offer the energy offer for sale for the one or more hours.

In yet another general embodiment, a machine-readable storage medium (e.g., a non-transitory storage medium) includes instructions that, when executed by a machine, cause the machine to perform operations comprising: accessing a production schedule plan of an energy consumer; predicting energy consumption by the energy consumer, utilizing a machine-learning model, based on the production schedule plan for a predetermined time period, the energy consumer having a baseline for hourly consumption during the predetermined time period, the predicting of the energy consumption including utilizing a machine-learning model to identify duration of energy-consuming processes during the predetermined time period; causing presentation of a user interface to present the production schedule plan and the predicted energy consumption for the each hour of the production schedule plan; receiving input, via the user interface, to establish the production schedule; based on the established production schedule, calculating recommendations for selling energy in each hour within the predetermined time period, the calculating the recommendations based on the predicted energy consumption and a probability of a penalty when energy consumption exceeds the baseline within each hour; receiving, via the user interface, an energy offer for sale for one or more hours; and interfacing with an energy marketplace operator to offer the energy offer for sale for the one or more hours.

Figure 12B:
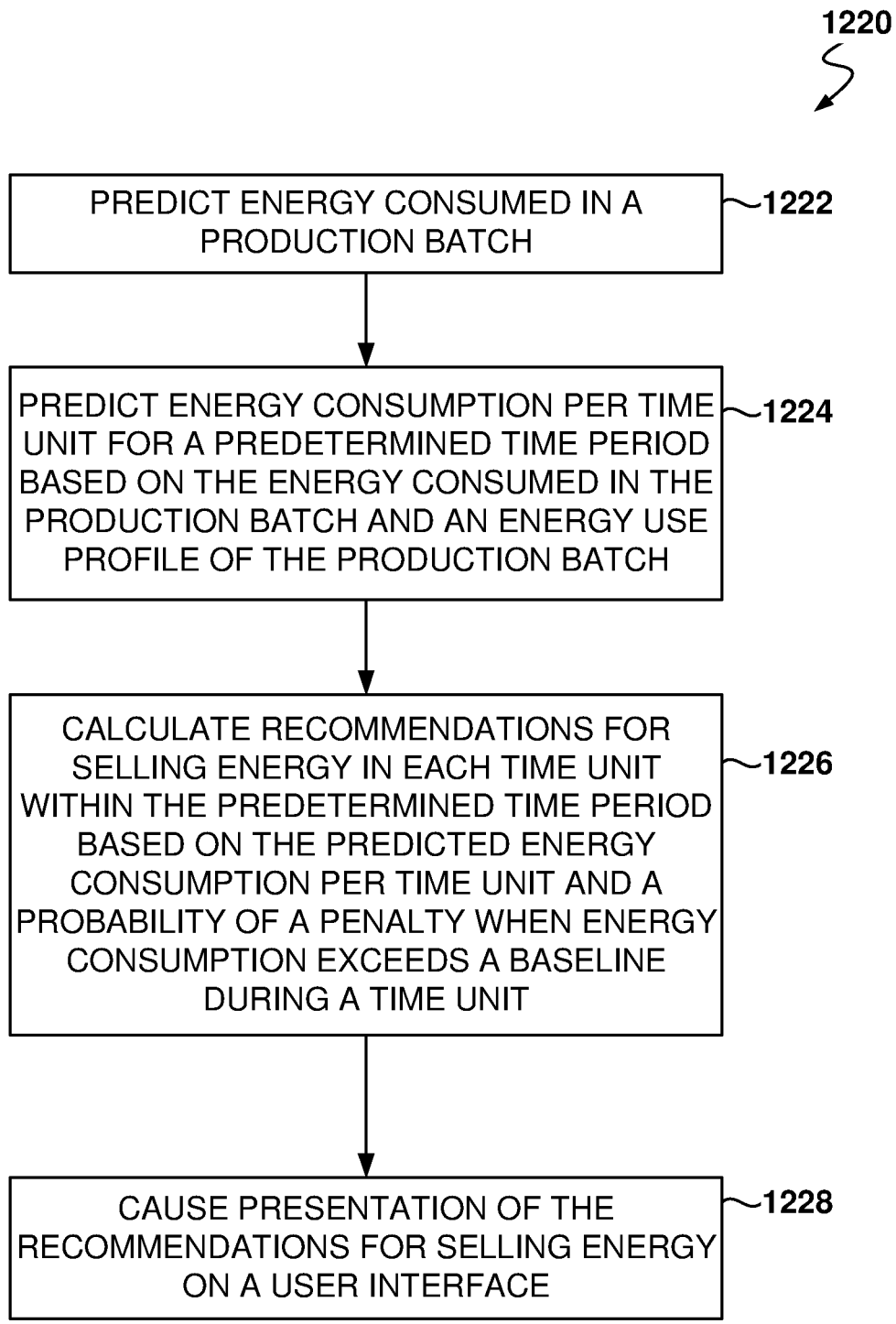
FIG. 12B is a flowchart of a method for managing energy usage at a manufacturing plant, according to some example embodiments.

FIG. 12B is a flowchart of a method for managing energy usage at a manufacturing plant, according to some example embodiments. Operation 1222 is for predicting, by one or more processors, energy consumed in a production batch.

From operation 1222, the method flows to operation 1224, where the one or more processors predict energy consumption per time unit for a predetermined time period based on the energy consumed in the production batch and an energy use profile of the production batch.

Further, from operation 1224, the method flows to operation 1226 for calculating, by the one or more processors, recommendations for selling energy in each time unit within the predetermined time period based on the predicted energy consumption per time unit and a probability of a penalty when energy consumption exceeds a baseline during a time unit. In some example embodiments, the recommendations are further based on other energy contract parameters such as unit penalty cost and revenue per unit energy sold.

At operation 1228, the one or more processors cause presentation of the recommendations for selling energy on a user interface.

Figure 13:
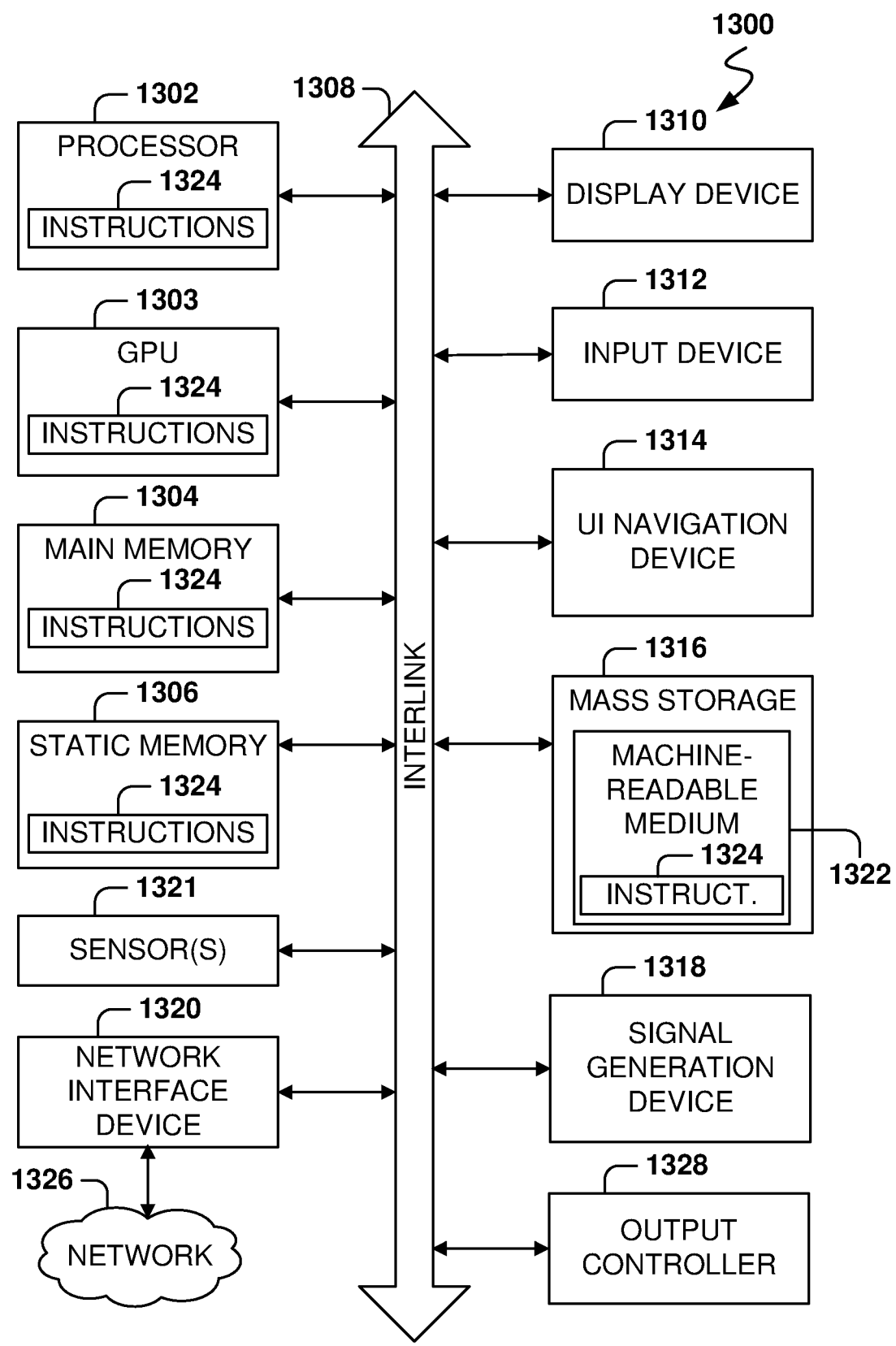
FIG. 13 is a block diagram illustrating an example of a machine upon or by which one or more example process embodiments described herein may be implemented or controlled.

FIG. 13 is a block diagram illustrating an example of a machine 1300 upon or by which one or more example process embodiments described herein may be implemented or controlled. In alternative embodiments, the machine 1300 may operate as a standalone device or may be connected (e.g., networked) to other machines. In a networked deployment, the machine 1300 may operate in the capacity of a server machine, a client machine, or both in server-client network environments. In an example, the machine 1300 may act as a peer machine in a peer-to-peer (P2P) (or other distributed) network environment. Further, while only a single machine 1300 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, by moveable placement of invariant massed particles, etc.) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1300 may include a hardware processor 1302 (e.g., a central processing unit (CPU), a hardware processor core, or any combination thereof), a graphics processing unit (GPU) 1303, a main memory 1304, and a static memory 1306, some or all of which may communicate with each other via an interlink (e.g., bus) 1308. The machine 1300 may further include a display device 1310, an alphanumeric input device 1312 (e.g., a keyboard), and a user interface (UI) navigation device 1314 (e.g., a mouse). In an example, the display device 1310, alphanumeric input device 1312, and UI navigation device 1314 may be a touch screen display. The machine 1300 may additionally include a mass storage device (e.g., drive unit) 1316, a signal generation device 1318 (e.g., a speaker), a network interface device 1320, and one or more sensors 1321, such as a Global Positioning System (GPS) sensor, compass, accelerometer, or another sensor. The machine 1300 may include an output controller 1328, such as a serial (e.g., universal serial bus (USB)), parallel, or other wired or wireless (e.g., infrared (IR), near field communication (NFC), etc.) connection to communicate with or control one or more peripheral devices (e.g., a printer, card reader, etc.).

The mass storage device 1316 may include a machine-readable medium 1322 on which is stored one or more sets of data structures or instructions 1324 (e.g., software) embodying or utilized by any one or more of the techniques or functions described herein. The instructions 1324 may also reside, completely or at least partially, within the main memory 1304, within the static memory 1306, within the hardware processor 1302, or within the GPU 1303 during execution thereof by the machine 1300. In an example, one or any combination of the hardware processor 1302, the GPU 1303, the main memory 1304, the static memory 1306, or the mass storage device 1316 may constitute machine-readable media.

While the machine-readable medium 1322 is illustrated as a single medium, the term "machine-readable medium" may include a single medium, or multiple media, (e.g., a centralized or distributed database, and/or associated caches and servers) configured to store the one or more instructions 1324.

The term "machine-readable medium" may include any medium that is capable of storing, encoding, or carrying instructions 1324 for execution by the machine 1300 and that cause the machine 1300 to perform any one or more of the techniques of the present disclosure, or that is capable of storing, encoding, or carrying data structures used by or associated with such instructions 1324. Non-limiting machine-readable medium examples may include solid-state memories, and optical and magnetic media. In an example, a massed machine-readable medium comprises a machine-readable medium 1322 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1324 may further be transmitted or received over a communications network 1326 using a transmission medium via the network interface device 1320.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
predicting, by one or more processors, energy consumed in a production batch, wherein the production batch is applied in a steel mill;
predicting, by one or more processors, energy consumption per time unit for a predetermined time period based on the energy consumed in the production batch and an energy use profile of the production batch, wherein predicting the energy consumption per time unit further comprises:
accessing a production schedule plan of an energy consumer;
predicting, utilizing a machine-learning model, the energy consumption based on the production schedule plan for the predetermined time period, the predicting of the energy consumption per time unit including utilizing the machine-learning model to predict a duration of energy-consuming processes during the predetermined time period;
predicting an amount of energy and a time duration for processing each heat in the production schedule plan, the amount of energy comprising energy used for burner gas and burner oxygen used during the production batch;
predicting an energy-time profile within each heat; and
predicting an energy usage per time unit during the predetermined time period;
calculating, by the one or more processors, recommendations for selling energy in each time unit within the predetermined time period based on the predicted energy consumption per time unit and a probability of a penalty when energy consumption exceeds a baseline during a time unit;
storing values obtain during operation comprising energy bought, energy offered for sale, energy sold, timestamps, and penalties incurred for energy used;
retraining the machine-learning model using the values obtained during operation, the retraining based on training data comprising values for features comprising energy per heat, start and end time of the heart, burner gas used, and burner oxygen used; and
causing, by the one or more processors, presentation of the recommendations for selling energy on a user interface.

2. The method as recited in claim 1, further comprising:
causing presentation of a user interface to present the production schedule plan and the predicted energy consumption per time unit; and
receiving input, via the user interface, to establish the production schedule.

3. The method as recited in claim 2, further comprising:
receiving, via the user interface, an energy offer for sale for one or more hours; and
interfacing with an energy marketplace operator to offer the energy offer for sale for the one or more hours.

4. The method as recited in claim 2, wherein the user interface provides an option to drag a heat from the production schedule plan to an actual time schedule.

5. The method as recited in claim 1, wherein predicting the energy consumption per time unit further includes:
determining energy consumed by a rest of the plant during the heat.

6. The method as recited in claim 1, wherein calculating recommendations for selling energy in each time unit includes:
calculating an energy offer recommendation for each time unit based on the penalty, the baseline, a predicted energy usage for the time unit, a market price for unit of energy, and an offer price for unit of energy.

7. The method as recited in claim 1, wherein a revenue from energy selling is based on a grace amount provided by an energy marketplace operator to compensate for difficulty in forecasting energy available for selling.

8. The method as recited in claim 1, wherein calculating recommendations for selling energy includes:
calculating a probability that an actual energy usage amount for the time unit is greater than a baseline energy usage amount for the time unit.

9. The method as recited in claim 1, wherein predicting the energy consumption includes:
generating predictions for Electric Arc Furnace (EAF) and a Ladle Metallurgical Furnace (LMF) considering that each heat is started after a previous heat ends.

10. The method as recited in claim 9, wherein predicting the energy consumption includes:
predicting energy consumption for a rest-of-hot area; and
predicting energy consumption for a rest-of-cold area.

11. The method as recited in claim 10, wherein predicting the energy consumption includes:
utilizing a linear regression model to compute hourly energy consumption estimates for the rest-of-hot area and the rest-of-cold area.

12. The method as recited in claim 1, wherein the energy consumption associated with a systematically-determined set of possible alternative schedules or sequencing patterns is used to determine an improved schedule or set of sequence options based on total energy consumed.

13. The method as recited in claim 1, wherein energy consumption associated with changes in output is estimated, and improved targets for the changes in output are determined and set via control systems.

14. The method as recited in claim 1, wherein calculating recommendations for selling energy is further based on a unit energy penalty cost and revenue per unit energy sold.

15. A system comprising:
a memory comprising instructions; and
one or more processors, wherein the instructions, when executed by the one or more processors, cause the system to perform operations comprising:
predicting, by one or more processors, energy consumed in a production batch, wherein the production batch is applied in a steel mill;
predicting energy consumption per time unit for a predetermined time period based on the energy consumed in the production batch and an energy use profile of the production batch, wherein predicting the energy consumption per time unit further comprises:
accessing a production schedule plan of an energy consumer;
predicting, utilizing a machine-learning model, the energy consumption based on the production schedule plan for the predetermined time period, the predicting of the energy consumption per time unit including utilizing the machine-learning model to predict a duration of energy-consuming processes during the predetermined time period;

predicting an amount of energy and a time duration for processing each heat in the production schedule plan, the amount of energy comprising energy used for burner gas and burner oxygen used during the production batch:

predicting an energy-time profile within each heat; and predicting an energy usage per time unit during the predetermined time period;

calculating recommendations for selling energy in each time unit within the predetermined time period based on the predicted energy consumption per time unit and a probability of a penalty when energy consumption exceeds a baseline during a time unit;

storing values obtain during operation comprising energy bought, energy offered for sale, energy sold, timestamps, and penalties incurred for energy used;

retraining the machine-learning model using the values obtained during operation, the retraining based on training data comprising values for features comprising energy per heat, start and end time of the heat, burner gas used, and burner oxygen used; and causing presentation of the recommendations for selling energy on a user interface.

16. The system as recited in claim 15, further comprising:

causing presentation of a user interface to present the production schedule plan and the predicted energy consumption per time unit;

receiving input, via the user interlace, to establish the production schedule;

receiving, via the user interface, an energy offer for sale for one or more hours; and interfacing with an energy marketplace operator to offer the energy offer for sale for the one or more hours.

17. A non-transitory machine-readable storage medium including instructions that, when executed by a machine, cause the machine to perform operations comprising:

predicting energy consumed in a production batch, wherein the production batch is applied in a steel mill;

predicting energy consumption per time unit for a predetermined time period based on the energy consumed in the production batch and an energy use profile of the production batch, wherein predicting the energy consumption per time unit further comprises:

accessing a production schedule plan of an energy consumer;

predicting, utilizing a machine-learning model, the energy consumption based on the production schedule plan for the predetermined time period, the predicting of the energy consumption per time unit including utilizing the machine-learning model to predict a duration of energy-consuming processes during the predetermined time period;

predicting an amount of energy and a time duration for processing each heat in the production schedule plan, the amount of energy comprising energy used for burner gas and burner oxygen used during the production batch;

predicting an energy-time profile within each heat; and predicting an energy usage per time unit during the predetermined time period;

calculating recommendations for selling energy in each time unit within the predetermined time period based on the predicted energy consumption per time unit and a probability of a penalty when energy consumption exceeds a baseline during a time unit;

storing values obtain during operation comprising energy bought energy offered for sale, energy sold, timestamps, and penalties incurred for energy used;

retraining the machine-learning model using the values obtained during operation, the retraining based on training data comprising values for features comprising energy per heat, start and end time of the heat, burner gas used, and burner oxygen used; and causing presentation of the recommendations for selling energy on a user interface.

18. The tangible machine-readable storage medium as recited in claim 17, wherein the machine further performs operations comprising:

causing presentation of a user interface to present a production schedule plan and the predicted energy consumption per time unit; and receiving input, via the user interface, to establish the production schedule.

19. The tangible machine-readable storage medium as recited in claim 17, wherein predicting the energy consumption per time unit further includes:

determining energy consumed by a rest of the plant during each heat.

20. The tangible machine-readable storage medium as recited in claim 17, wherein calculating recommendations for selling energy in each time unit includes:

calculating an energy offer recommendation for each time unit based on the penalty, the baseline, a predicted energy usage for the time unit, a market price for unit of energy, and an offer price for unit of energy.

* * * * *

UNITED STATES PATENT AND TRADEMARK OFFICE
CERTIFICATE OF CORRECTION

| | |
|---|---|
| PATENT NO. | : 11,468,524 B2 |
| APPLICATION NO. | : 16/382544 |
| DATED | : October 11, 2022 |
| INVENTOR(S) | : Leung et al. |

It is certified that error appears in the above-identified patent and that said Letters Patent is hereby corrected as shown below:

In the Claims

In Column 23, Line 49, in Claim 1, delete "heart," and insert --heat,-- therefor In Column 25, Line 7, in Claim 15, delete "batch:" and insert --batch;-- therefor In Column 25, Line 31, in Claim 16, delete "interlace," and insert --interface,-- therefor In Column 26, Line 20, in Claim 17, after "bought", insert --,--

Signed and Sealed this
Twenty-second Day of August, 2023

Katherine Kelly Vidal
*Director of the United States Patent and Trademark Office*